United States Patent
Luo et al.

(10) Patent No.: US 10,271,267 B2
(45) Date of Patent: *Apr. 23, 2019

(54) EFFICIENT SYSTEM IDENTIFICATION SCHEMES FOR COMMUNICATION SYSTEMS

(71) Applicant: QUALCOMM Incorporated, San Diego, CA (US)

(72) Inventors: Tao Luo, San Diego, CA (US); Durga Prasad Malladi, San Diego, CA (US); Juan Montojo, Nuremberg (DE); Peter Gaal, San Diego, CA (US); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/800,408

(22) Filed: Jul. 15, 2015

(65) Prior Publication Data
US 2015/0319023 A1    Nov. 5, 2015

Related U.S. Application Data

(63) Continuation of application No. 12/248,303, filed on Oct. 9, 2008, now Pat. No. 9,119,132.

(Continued)

(51) Int. Cl.
*H04W 48/12* (2009.01)
*H04W 56/00* (2009.01)
(Continued)

(52) U.S. Cl.
CPC ......... *H04W 48/12* (2013.01); *H04L 27/2602* (2013.01); *H04W 56/001* (2013.01); *H04J 11/0069* (2013.01)

(58) Field of Classification Search
CPC .............. H04W 48/12; H04W 56/001; H04L 27/2602; H04J 11/0069
(Continued)

(56) References Cited

U.S. PATENT DOCUMENTS 5,930,366 A    7/1999   Jamal et al.
6,282,405 B1*  8/2001   Brown ............... H02J 13/0027
                                                            307/3
(Continued)

FOREIGN PATENT DOCUMENTS

EP        1443684 A2     8/2004
EP        1780920 A1     5/2007
(Continued)

OTHER PUBLICATIONS

Qualcomm Europe: "Link Analysis of Initial Cell Search" 3GPP Draft; R1-062691, 3rd Generation Partnership Project (3GPP), Mobile Competence Centre ; 650, Route Des Lucioles ; F-06921 Ophia-Antipolis Cedex ; France, vol. tsg_ran\WG1_RL1\TSGR1_46bis\Docs, no. Seoul, Korea; Oct. 9, 2006, Oct. 3, 2006 (Oct. 3, 2006), XP050103180, http://www.qtc.jp/3GPP/TSG_RAN/TSG_RAN2006/TSG_RAN_WG1_RL1_10.html.
(Continued)

*Primary Examiner* — Christine Ng
(74) *Attorney, Agent, or Firm* — Dalei Dong; Arent Fox

(57) ABSTRACT

Systems and methodologies are described that facilitate efficiently indicating parameter(s) associated with a base station utilizing synchronization signals in a wireless communication environment. For instance, relative locations of a PSC and a SSC in a radio frame can be a function of a parameter. Further, a PSC sequence utilized to generate PSCs can be selected based upon a parameter. Moreover, inclusion or exclusion of PSCs from a radio frame can be a function of a parameter. Additionally or alternatively, (Continued)

pseudo random sequence mappings (e.g., to cell IDs, tone locations) can be a function of a parameter. Example parameters can be whether the base station is part of a TDD or a FDD system, whether the radio frame employs FS1 or FS2, whether the base station is associated with a macro or a femto cell, or whether the base station is associated with a unicast or a multicast system.

28 Claims, 14 Drawing Sheets

Related U.S. Application Data

(60) Provisional application No. 60/979,056, filed on Oct. 10, 2007, provisional application No. 60/982,265, filed on Oct. 24, 2007, provisional application No. 61/023,528, filed on Jan. 25, 2008.

(51) Int. Cl.
  *H04L 27/26* (2006.01)
  *H04J 11/00* (2006.01)

(58) Field of Classification Search
  USPC ....... 370/252, 328, 335, 336, 337, 338, 342, 370/343, 344, 347, 350
  See application file for complete search history.

(56) References Cited

U.S. PATENT DOCUMENTS

| | | | |
|---|---|---|---|
| 6,363,060 B1 | 3/2002 | Sarkar | |
| 6,480,558 B1* | 11/2002 | Ottosson | H04B 1/7083 375/350 |
| 6,535,566 B1* | 3/2003 | Tamamura | H04L 27/22 375/371 |
| 6,717,930 B1* | 4/2004 | Sezgin | H04B 1/70735 370/335 |
| 6,768,768 B2 | 7/2004 | Rao et al. | |
| 6,831,929 B1* | 12/2004 | Sriram | H04B 1/70735 370/515 |
| 6,834,046 B1 | 12/2004 | Hosur et al. | |
| 6,894,995 B2 | 5/2005 | Chitrapu et al. | |
| 6,920,123 B1 | 7/2005 | Shin et al. | |
| 6,996,162 B1 | 2/2006 | Hosur et al. | |
| 7,065,064 B2* | 6/2006 | Chitrapu | H04B 1/7083 370/335 |
| 7,321,584 B2 | 1/2008 | Lee et al. | |
| 7,400,654 B2 | 7/2008 | Raaf | |
| 7,715,439 B2* | 5/2010 | Sood | H04W 56/0085 370/350 |
| 7,969,964 B2* | 6/2011 | Kim | H04J 11/0093 370/350 |
| 9,119,132 B2* | 8/2015 | Luo | H04W 56/001 |
| 2002/0075833 A1 | 6/2002 | Dick et al. | |
| 2003/0063656 A1 | 4/2003 | Rao et al. | |
| 2003/0088694 A1* | 5/2003 | Patek | H04L 49/201 709/238 |
| 2003/0117979 A1 | 6/2003 | Chitrapu | |
| 2003/0133431 A1 | 7/2003 | Rudolf | |
| 2004/0223517 A1* | 11/2004 | Rimi | H04B 1/70735 370/509 |
| 2004/0248602 A1 | 12/2004 | Demir et al. | |
| 2007/0133390 A1* | 6/2007 | Luo | H04B 1/7083 370/208 |
| 2008/0080439 A1* | 4/2008 | Aziz | H04L 5/0016 370/338 |
| 2008/0268885 A1* | 10/2008 | Onggosanusi | H04J 11/0069 455/466 |
| 2008/0316911 A1* | 12/2008 | Wilhelmsson | H04J 11/0076 370/210 |
| 2008/0316947 A1* | 12/2008 | Lindoff | H04J 11/0069 370/294 |
| 2009/0161652 A1* | 6/2009 | Chang | H04J 11/0079 370/350 |

FOREIGN PATENT DOCUMENTS

| | | |
|---|---|---|
| JP | 2001515294 A | 9/2001 |
| JP | 2004064271 A | 2/2004 |
| JP | 2006253987 A | 9/2006 |
| KR | 20030041104 A | 5/2003 |
| KR | 20040071150 | 8/2004 |
| KR | 20050090333 A | 9/2005 |
| KR | 20060054493 A | 5/2006 |
| RU | 2211531 C2 | 8/2003 |
| RU | 2283537 C2 | 9/2006 |
| WO | WO-9912273 A1 | 3/1999 |
| WO | WO-0044106 A1 | 7/2000 |
| WO | WO-2001001596 | 1/2001 |
| WO | WO-03026147 | 3/2003 |
| WO | WO-03047117 A2 | 6/2003 |

OTHER PUBLICATIONS

3GPP TS 36.21 1, V1.2.0, 3rd Generation Partnership Project; Technical Specification Group Radio Access Network; Physical Channels and Modulation (Release 8), Jun. 2007.
3GPP TS 36.211 V8.0.0; 3rd Generation Partnership Project;Technical Specification Group Radio Access Network; Evolved Universal Terrestrial Radio Access (E-UTRA); Physical channels and modulation (Release 8), [Online] 2007, pp. 1-50, XP002520076 Retrieved from the Internet: URL:http://wwwSgpporg/ftp/Specs/html-i nf o/36211htm> [retrieved on Sep. 27, 2007] Section 5.
3GPP TS 36.212, V1.3.0, 3rd Generation Partnership Project; Technical Specification Group Radio Access Network; Multiplexing and channel coding (Release 8), Jul. 2007.
Ericsson, "Downlink reference-signals [online]", 2006, 3GPP TSG-RAN WG1#46b R1-062966, <URL:http://www.3gpp.org/ftp/tsg_ran/WG1_RL1/TSGR1_46bis/Docs/R1-062966.zip>.
International Search Report and Written Opinion—PCT/US2008/079527, International Search Authority—European Patent Office—Apr. 21, 2009.
IPWireless, "Signalling of TDD frame configuration", 3GPP TSG-RAN WG2#58bis, 3GPP, R2-072526, Jun. 29, 2007, pp. 1-4.
Qualcomm Europe, "Initial cell search: analysis and simulations," 3GPP TSG-RAN WG1 #47, Nov. 6-10, 2006, Riga, Latvia, R1-063431, pp. 1-11.
Qualcomm Europe: "Link analysis of initial cell search" 3GPP TSGRAN WG1 #46BIS, [Online] vol. r1-062691, Oct. 19, 2006 (Oct. 19, 2006) , —Oct. 13, 2006 (Oct. 13, 2006) pp. 1-13, XP002476876 Seoul, Korea Retrieved from the Internet: URL:http://www.3gpp.org/ftp/tsg_ran/ WG1_RL 1/TSGR1_ 46bis/Oocs/R1-062691.zip [retrieved on Apr. 16, 2008].
Taiwan Search Report—TW097139243—TIPO—Aug. 26, 2012.
Dahlman et al., "3G Evolution HSPA and LTE for Mobile Broadband", Elsevier Ltd., LTE access procedures, pp. 357-359.
European Search Report—EP14189613—Search Authority—Munich—Jan. 16, 2015.
"Evolved Universal Terrestrial Radio Access (E-UTRA); Physical Channels and Modulation," 3GPP TS 36.211 V0.3.1, Feb. 6, 2007 (Feb. 6, 2007), pp. 1-28, XP008115612.

\* cited by examiner

EFFICIENT SYSTEM IDENTIFICATION SCHEMES FOR COMMUNICATION SYSTEMS

CROSS-REFERENCE TO RELATED APPLICATIONS

This application is a continuation of U.S. patent application Ser. No. 12/248,303 entitled "EFFICIENT SYSTEM IDENTIFICATION SCHEMES FOR COMMUNICATION SYSTEMS" filed Oct. 9, 2008, which claims the benefit of U.S. Provisional Patent Application Ser. No. 60/979,056 entitled "EFFICIENT SYSTEM IDENTIFICATION SCHEMES FOR COMMUNICATION SYSTEMS" which was filed Oct. 10, 2007, U.S. Provisional Patent Application Ser. No. 60/982,265 entitled "EFFICIENT SYSTEM IDENTIFICATION SCHEMES FOR COMMUNICATION SYSTEMS" which was filed Oct. 24, 2007, and U.S. Provisional Patent Application Ser. No. 61/023,528 entitled "EFFICIENT SYSTEM IDENTIFICATION SCHEMES FOR COMMUNICATION SYSTEMS" which was filed Jan. 25, 2008. The aforementioned applications are hereby expressly incorporated herein by reference in their entireties.

BACKGROUND

I. Field

The following description relates generally to wireless communications, and more particularly to employing an efficient scheme for indicating system parameter(s) in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Various parameter(s) can be associated with each base station in a wireless communication system. The parameter(s) can relate to radio frame structure type, duplexing technique, cell type, unicast versus multicast operation, and so forth. For example, the base station can utilize one of two possible radio frame structures (e.g., frame structure type 1 or frame structure type 2 as set forth in the Evolved UMTS Terrestrial Radio Access (E-UTRA) specification). Further, the base station can be part of a TDD system or a FDD system. Moreover, the base station can be associated with a macro cell or a femto cell. Additionally or alternatively, the base station can be part of a unicast system or a multicast system.

Conventionally, an access terminal lacks knowledge of parameter(s) associated with a base station with which it is interacting upon initialization of a connection therebetween. For instance, upon power-up, an access terminal can begin to transmit data to and/or receive data from a particular base station. However, the access terminal can be unaware of the radio frame structure type, duplexing technique, cell type, and/or unicast/multicast operation utilized by or associated with the base station with which it is communicating.

Common techniques employed by access terminals to identify various parameter(s) associated with corresponding base stations are oftentimes inefficient and time consuming. By way of illustration, an access terminal typically effectuates acquisition by decoding information sent over a broadcast channel as well as subsequently transferred information. Thus, signals sent by the base station are commonly decoded to determine one or more of the aforementioned parameters. However, decoding of these signals can be difficult at best when such parameter(s) are unknown. According to an example, an access terminal can be unable to differentiate between use of frame structure type 1 and frame structure type 2 when employing blind cyclic prefix (CP) detection.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating efficient indication of parameter(s) associated with a base station utilizing synchronization signals in a wireless communication environment. For instance, relative locations of a PSC and a SSC in a radio frame can be a function of a parameter. Further, a PSC sequence utilized to generate PSCs can be selected based upon a parameter. Moreover, inclusion or exclusion of PSCs from a radio frame can be a function of a parameter. Additionally or alternatively, pseudo random sequence mappings (e.g., to cell IDs, tone locations) can be a function of a parameter. Example parameters can be whether the base station is part of a TDD or a FDD system, whether the radio frame employs FS1 or FS2, whether the base station is associated with a macro or a femto cell, or whether the base station is associated with a unicast or a multicast system.

According to related aspects, a method that facilitates identifying one or more parameters related to a base station in a wireless communication environment is described herein. The method can include generating a primary synchronization code (PSC) and a secondary synchronization code (SSC). Further, the method can comprise scheduling the PSC and the SSC at relative locations in a radio frame as a function of a first parameter corresponding to a base station. Moreover, the method can include transmitting the radio frame over a downlink to indicate the first parameter based upon the relative locations of the PSC and the SSC.

Another aspect relates to a wireless communications apparatus. The wireless communications apparatus can include a memory that retains instructions related to selecting a primary synchronization code (PSC) sequence based upon a first parameter of a base station, generating a primary synchronization code (PSC) based upon the selected PSC sequence, and transmitting a radio frame that includes the generate PSC over a downlink to indicate the first parameter based upon the selected PSC sequence. Further, the wireless communications apparatus can include a processor, coupled to the memory, configured to execute the instructions retained in the memory.

Yet another aspect relates to a wireless communications apparatus that enables efficiently indicating one or more parameters to at least one access terminal in a wireless communication environment. The wireless communications apparatus can include means for scheduling a primary synchronization code (PSC) and a secondary synchronization code (SSC) at relative locations in a radio frame as a function of a first parameter corresponding to a base station. Further, the wireless communications apparatus can include means for sending the radio frame over a downlink to identify the first parameter based upon the relative locations of the PSC and the SSC.

Still another aspect relates to a computer program product that can comprise a computer-readable medium. The computer-readable medium can include code for selecting a primary synchronization code (PSC) sequence based upon a first parameter of a base station. Further, the computer-readable medium can include code for generating a primary synchronization code (PSC) based upon the selected PSC sequence. Moreover, the computer-readable medium can include code for transmitting a radio frame that includes the generate PSC over a downlink to indicate the first parameter based upon the selected PSC sequence.

In accordance with another aspect, an apparatus in a wireless communication system can include a processor, wherein the processor can be configured to schedule a primary synchronization code (PSC) and a secondary synchronization code (SSC) at relative locations in a radio frame as a function of a first parameter corresponding to a base station. Moreover, the processor can be configured to send the radio frame over a downlink to identify the first parameter based upon the relative locations of the PSC and the SSC.

According to other aspects, a method that facilitates deciphering at least one parameter corresponding to a base station in a wireless communication environment is described herein. The method can include receiving a radio frame from a base station. Moreover, the method can include analyzing the radio frame to determine at least one of relative locations of disparate types of synchronization signals, a sequence utilized to generate a particular type of synchronization signal, or whether the radio frame includes two types of synchronization signals. Further, the method can comprise recognizing at least one parameter associated with the base station based upon the relative locations, the sequence, or whether the radio frame includes two types of synchronization signals.

Yet another aspect relates to a wireless communications apparatus that can include a memory that retains instructions related to receiving a radio frame from a base station, analyzing the radio frame to determine at least one of relative locations of disparate types of synchronization signals, a sequence utilized to generate a particular type of synchronization signal, or whether the radio frame includes two types of synchronization signals, and recognizing at least one parameter associated with the base station based upon the relative locations, the sequence, or whether the radio frame includes two types of synchronization signals. Further, the wireless communications apparatus can comprise a processor, coupled to the memory, configured to execute the instructions retained in the memory.

Another aspect relates to a wireless communications apparatus that enables identifying one or more parameters relative to a base station in a wireless communication environment. The wireless communications apparatus can include means for analyzing a radio frame received from a base station to decipher at least one of relative locations of disparate types of synchronization signals, a sequence utilized to generate a particular type of synchronization signal, or whether the radio frame includes two types of synchronization signals. Further, the wireless communications apparatus can include means for recognizing at least one parameter associated with the base station based upon the relative locations, the sequence, or whether the radio frame includes two types of synchronization signals.

Still another aspect relates to a computer program product that can comprise a computer-readable medium. The computer-readable medium can include code for analyzing a radio frame received from a base station to decipher at least one of relative locations of disparate types of synchronization signals, a sequence utilized to generate a particular type of synchronization signal, or whether the radio frame includes two types of synchronization signals. Moreover, the computer-readable medium can comprise code for recognizing at least one parameter associated with the base station based upon the relative locations, the sequence, or whether the radio frame includes two types of synchronization signals.

In accordance with another aspect, an apparatus in a wireless communication system can include a processor, wherein the processor can be configured to evaluate a radio frame received from a base station to decipher at least one of relative locations of disparate types of synchronization signals, a sequence utilized to generate a particular type of synchronization signal, or whether the radio frame includes two types of synchronization signals. Further, the processor can be configured to determine at least one parameter associated with the base station based upon the relative locations, the sequence, or whether the radio frame includes two types of synchronization signals.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
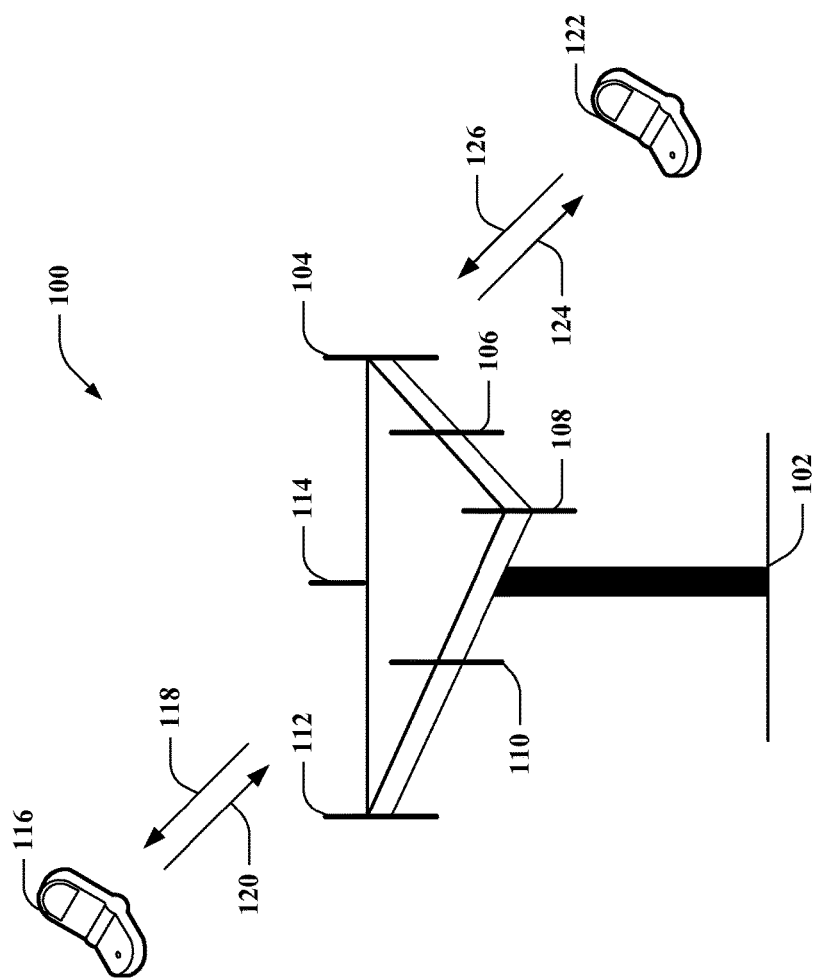
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 employs an efficient scheme for identifying system parameter(s). Base station 102 can utilize synchronization signals to indicate one or more parameters associated with base station 102 to access terminals 116 and 122. By employing synchronization signals to provide notification as to various parameter(s) associated with base station 102, blind decoding of downlink information by access terminals 116 and 122 without knowledge of such parameter(s) can be mitigated. Thus, access terminals 116 and 122 can use the synchronization signals to identify parameter(s) without effectuating blind decoding of information sent over the downlink, which leads to more efficient notification of such parameter(s) to access terminals 116 and 122.

One or more parameters can be indicated to access terminals 116 and 122 via the synchronization signals. For instance, the synchronization signals can inform access terminals 116 and 122 whether base station 102 employs frame structure type 1 (FS1) or frame structure type 2 (FS2). According to another illustration, the synchronization signals can indicate to access terminals 116 and 122 whether base station 102 is part of a time division duplex (TDD) system or a frequency division duplex (FDD) system. Pursuant to another example, the synchronization signals can specify to access terminals 116 and 122 whether base station 102 is associated with a macro cell or a femto cell. Additionally or alternatively, the synchronization signals can notify access terminals 116 whether base station 102 is associated with a unicast system or a multicast system. It is to be appreciated, however, that the claimed subject matter is not limited to the aforementioned example parameters; rather, any other parameters related to base station 102 are intended to fall within the scope of the hereto appended claims.

One or more types of synchronization signals can be transmitted by base station 102. For instance, a primary synchronization code (PSC) signal and/or a secondary synchronization code (SSC) signal can be transferred by base station 102. A primary synchronization code signal can be a synchronization signal used for cell detection during initial cell search and a secondary synchronization code signal can be a synchronization signal used for cell identification during initial cell search.

A primary synchronization signal can be generated based on a PSC sequence and referred to as a PSC signal. The PSC sequence can be a constant amplitude zero auto correlation (CAZAC) sequence, a pseudo-random number (PN) sequence, etc. Some example CAZAC sequences include a Chu sequence, a Zadoff-Chu sequence, a Frank sequence, a generalized chirp-like (GCL) sequence, and the like. A secondary synchronization signal can be generated based on a SSC sequence and referred to as a SSC signal. The SSC sequence can be a maximum-length sequence (M-sequence), a PN sequence, a binary sequence, etc. Further, the PSC signal can be referred to as the primary synchronization signal, PSC, etc. and the SSC signal can be referred to as the secondary synchronization signal, SSC, etc.

In system 100, parameters corresponding to base station 102 can be indicated based upon one or more factors corresponding to the synchronization signals such as relative location of different types of synchronization signals within a radio frame, selected sequence utilized to generate the synchronization signals of a given type, inclusion or exclusion of a particular type of synchronization signal, and so forth. In contrast, conventional techniques oftentimes leverage blind detection of cyclic prefixes (CPs) by access terminals for attempting to identify parameters, which can be ineffective and/or inefficient. For instance, CP lengths can be different between FS2 and FS1 in PSC and SSC (e.g., 8.33 microseconds (us) and 17.71 us for PSC and SSC, respectively, for FS2 versus 5.21 us and 16.67 us for PSC and SSC, respectively, for FS1). CP can be blindly detected between normal CP (e.g., 5.21 us) and extended CP (e.g., 16.67 us) for FS1 by an access terminal. Further, an access terminal can utilize blind CP detection for FS2 to differentiate normal CP (e.g., 8.33 us) and extended CP (e.g., 17.71 us). As a result, such conventional techniques using CP blind detection can be unable to differentiate FS1 from FS2.

Further, primary broadcast channel (PBCH) locations can be different between FS1 and FS2. Blind PBCH decoding, oftentimes effectuated by common approaches, can be carried out by doubling access terminal PBCH decoding complexity (e.g., 24 blind decoding including blind antenna detection and 40 ms frame boundary detection during initial acquisition per 10 ms) to differentiate FS1 from FS2. In addition, SSC detection can be doubled due to four different CP lengths being utilized unless unification is leveraged; however, unification can be cost-prohibitive given that FS2 can assume that guard gap (GP) is absorbed in CP unless FS1 pays higher overheads for FDD normal CP). Thus, common techniques can inefficiently differentiate FS1 from FS2.

Moreover, conventional techniques can fail to provide sufficient guard time between downlink pilot time slot (DwPTS) and uplink pilot time slot (UpPTS) for FS2. In contrast, system 100 can provide a larger guard time for uplink and downlink switching.

Figure 2:
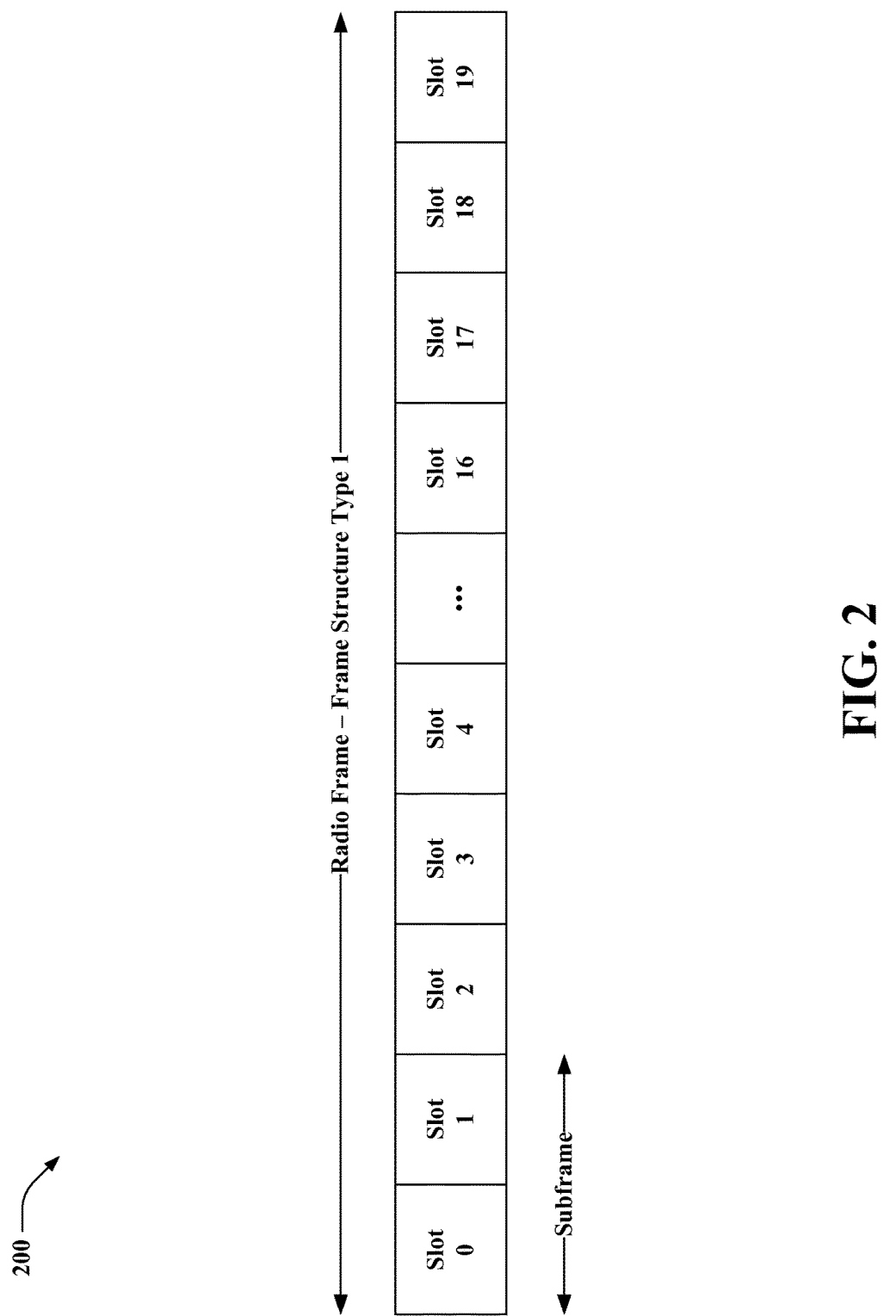
FIG. 2 is an illustration of an example frame structure type 1 (FS1) radio frame.
Figure 3:
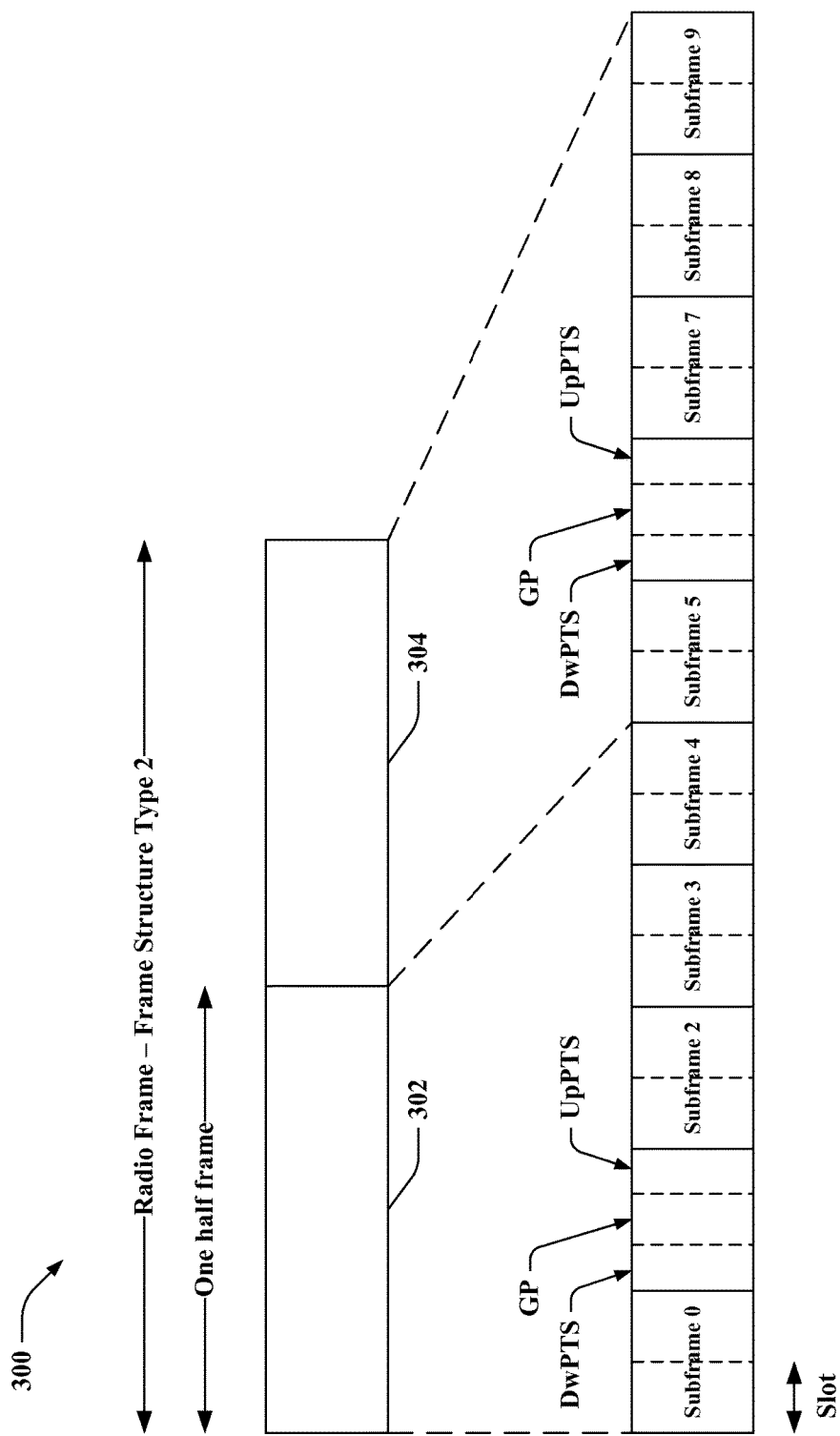
FIG. 3 is an illustration of an example frame structure type 2 (FS2) radio frame.

Now referring to FIGS. 2-3, illustrated are example radio frame structures. Two radio frame structures are set forth in the E-UTRA specification: namely, frame structure type 1 (FS1) and frame structure type 2 (FS2). FS1 can be applicable to both FDD and TDD systems, while FS2 can be applicable to TDD systems. It is to be appreciated that FIGS. 2-3 are provided for illustrative purposes and the disclosed subject matter is not limited to the scope of these examples (e.g., radio frames with any duration, number of subframes, number of slots, and the like can be employed, . . . ).

Turning to FIG. 2, illustrated is an example frame structure type 1 (FS1) radio frame 200. FS1 radio frame 200 can be utilized in connection with FDD or TDD. Further, FS1 radio frame 200 can be a 10 ms radio frame that includes 20 slots (e.g., slot 0, . . . , slot 19), where each of the slots has a duration of 0.5 ms. Moreover, two adjacent slots (e.g., slots 0 and 1, slots 2 and 3, . . . ) from FS1 radio frame 200 can make up one subframe with a duration of 1 ms; accordingly, FS1 radio frame 200 can include 10 subframes.

With reference to FIG. 3, illustrated is an example frame structure type 2 (FS2) radio frame 300. FS2 radio frame 300 can be employed in connection with TDD. FS2 radio frame 300 can be a 10 ms radio frame that includes 10 subframes. Further, FS2 radio frame 300 can include two substantially similar half-frames (e.g., half-frame 302 and half-frame 304), each of which can have a duration of 5 ms. Each of the half-frames 302-304 can include eight slots, each with a duration of 0.5 ms, and three fields (e.g., DwPTS, GP, and UpPTS) that each have configurable individual lengths and a total length of 1 ms. A subframe includes two adjacent slots, except for subframes 1 and 6, which include DwPTS, GP, and UpPTS.

Figure 4:
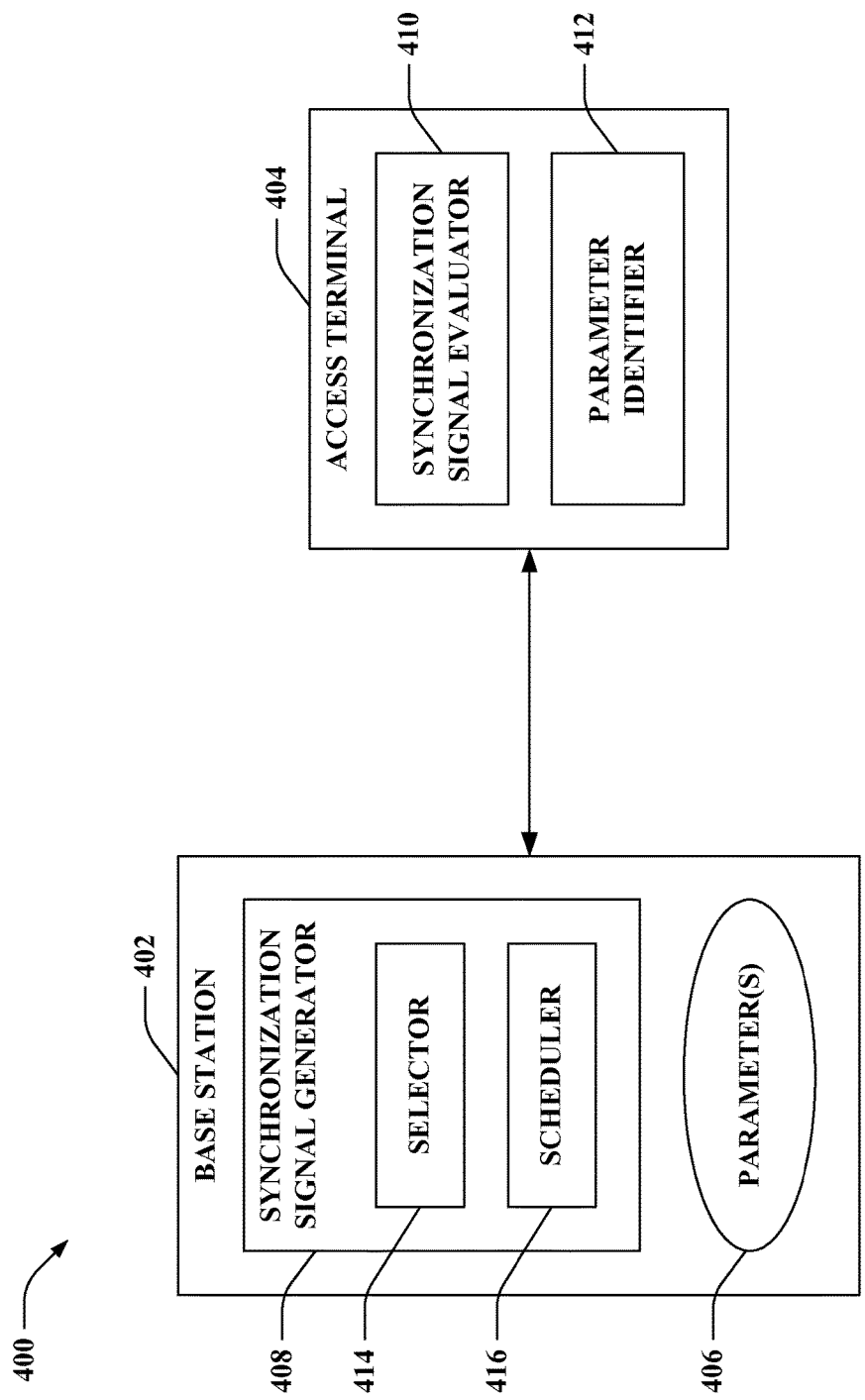
FIG. 4 is an illustration of an example system that utilizes synchronization signals to indicate base station related parameter(s) in a wireless communication environment.

Referring to FIG. 4, illustrated is a system 400 that utilizes synchronization signals to indicate base station related parameter(s) in a wireless communication environment. System 400 includes a base station 402 that can transmit and/or receive information, signals, data, instructions, commands, bits, symbols, and the like. Base station 402 can communicate with an access terminal 404 via the forward link and/or reverse link. Access terminal 404 can transmit and/or receive information, signals, data, instructions, commands, bits, symbols, and the like. Moreover, although not shown, it is contemplated that any number of base stations similar to base station 402 can be included in system 400 and/or any number of access terminals similar to access terminal 404 can be included in system 400.

Base station 402 can be associated with one or more parameter(s) 406 that are to be disseminated to access terminal 404 via synchronization signals. Further, base station 402 can include a synchronization signal generator 408 that yields synchronization signals for downlink transmission as a function of the one or more parameter(s) 406 corresponding to base station 402. For example, synchronization signal generator 408 can yield synchronization signal(s) for transmission based upon a chosen sequence, schedule types of synchronization signal(s) within a radio frame, enable or inhibit inclusion of a given type of synchronization signal, choose a pseudo-random sequence to be employed, a combination thereof, and so forth based upon the parameter(s) 406 of base station 402 being indicated to access terminal 404. Moreover, the synchronization signals provided by synchronization signal generator 408 can be transmitted to access terminal 404.

Access terminal 404 can receive the synchronization signals from base station 402 and determine parameter(s) associated with base station 402 based upon the received synchronization signals. Access terminal 404 can further include a synchronization signal evaluator 410 and a parameter identifier 412. Synchronization signal evaluator 410 can analyze the received synchronization signals. By way of illustration, synchronization signal evaluator 410 can determine an identity of a sequence pertaining to a given type of received synchronization signals, relative locations of different types of synchronization signals within a radio frame, inclusion or exclusion of a given type of synchronization signal, pseudo-random sequence utilized, a combination thereof, etc. Further, based upon the analysis, parameter identifier 412 can recognize parameter(s) associated with base station 402. Parameter identifier 412 can leverage the analysis of the received synchronization signals effectuated by synchronization signal evaluator 410 to decipher the parameter(s) corresponding to base station 402 based upon a priori knowledge of how synchronization signal generator 408 selects, schedules, etc. synchronization signals. For example, the relative location of different types of synchronization signals in a radio frame as recognized by synchronization signal evaluator 410 can be utilized by parameter identifier 412 to determine whether frame structure type 1 or frame structure type 2 is employed by base station 402; however, it is to be appreciated that the claimed subject matter is not limited to such example.

Synchronization signal generator 408 of base station 402 can include a selector 414 that can determine a synchronization code sequence to employ for generating synchronization signals. Different PSC sequences can be elected by selector 414 as a function of a parameter 406, and PSCs can be yielded based upon the selected PSC sequences by synchronization signal generator 408 for transmission over the downlink. Thus, synchronization signal evaluator 410 can detect which PSC sequence is chosen by selector 414 and used by synchronization signal generator 408 for received synchronization signals (e.g., PSCs, . . . ), and parameter identifier 412 can recognize the parameter corresponding to the detected PSC sequence.

For example, different PSC sequences can be chosen by selector 414 for use by synchronization signal generator 408 to differentiate between FS1 and FS2. Conventional systems oftentimes employ three PSC sequences (e.g., two of these three PSC sequences can be complex conjugates of each other, . . . ). In contrast, system 400 can add one additional PSC sequence (e.g., a fourth PSC sequence, . . . ). The fourth PSC sequence can be defined in the frequency domain as a complex conjugate of the PSC sequence out of the three commonly employed PSC sequences from conventional systems that is not a complex conjugate of the other two PSC sequences. Further, selector 414 can choose to utilize the three commonly employed PSC sequences if base station 402 utilizes FS1 and the additional, fourth PSC sequence if base station 402 employs FS2. Thus, one PSC sequence can be used to indicate FS2, while three PSC sequences can be utilized to signify FS1. Accordingly, synchronization signal evaluator 410 can attempt to detect these four PSC sequences. If one of the three commonly employed PSC sequences is detected by synchronization signal evaluator 410, then parameter identifier 412 can recognize that base station 402 utilizes FS1. Alternatively, if the fourth PSC sequence is detected by synchronization signal evaluator 410, then parameter identifier 412 can determine that base station 402 employs FS2. According to another illustration, it is contemplated that the fourth PSC sequence can be leveraged to identify use of FS1 by base station 402, while the other three commonly employed PSC sequences can be employed to identify use of FS2 by base station 402.

Pursuant to a further example, different PSC sequences can be utilized by selector 414 to indicate that base station 402 is associated with a unicast system or a multicast system. Following this example, selector 414 can choose a particular PSC sequence to be utilized by synchronization signal generator 408 for yielding PSCs to differentiate a Multimedia Broadcast over a Single Frequency Network (MBSFN) carrier from other FDD/TDD systems (e.g., unicast carrier, . . . ). MBSFN can use a time-synchronized common waveform that is transmitted from multiple cells for a given duration; accordingly, multiple base stations (e.g., base station 402 and any number of disparate base station(s) (not shown), . . . ) can send the same information to access terminal 404. Further, the multicast system can use a MBSFN carrier, which can be a dedicated carrier. Thus, selector 414 can allow for identifying to access terminal 404 whether base station 402 uses a MBSFN carrier. Similar to the above example, four PSC sequences can be leveraged by system 400 (e.g., the three commonly employed PSC sequences and the additional, fourth sequence, . . . ). Again, the fourth PSC sequence can be defined in the frequency domain as a complex conjugate of the PSC sequence out of the three commonly employed PSC sequences from conventional systems that is not a complex conjugate of the other two PSC sequences. Further, selector 414 can choose to utilize the three commonly employed PSC sequences if base station 402 utilizes a non-MBSFN carrier (e.g., unicast carrier, . . . ) and the additional, fourth PSC sequence if base station 402 employs the MBSFN carrier. Thus, one PSC sequence can be used to indicate use of the MBSFN carrier, while three PSC sequences can be utilized to signify use of the non-MB SFN carrier. Accordingly, synchronization signal evaluator 410 can attempt to detect these four PSC sequences. If one of the three commonly employed PSC sequences is detected by synchronization signal evaluator 410, then parameter identifier 412 can recognize that base station 402 utilizes a non-MBSFN carrier. Alternatively, if the fourth PSC sequence is detected by synchronization signal evaluator 410, then parameter identifier 412 can determine that base station 402 employs a MBSFN carrier. According to another illustration, it is contemplated that the fourth PSC sequence can be leveraged to identify use of a non-MBSFN carrier by base station 402, while the other three commonly employed PSC sequences can be employed to identify use of the MBSFN carrier by base station 402. Similarly, it is also contemplated that different PSC sequences can be utilized to distinguish between base station 402 being associated with a femto cell versus a nominal cell (e.g., macro cell, . . . ) and/or a TDD system versus a FDD system.

Synchronization signal generator 408 can additionally or alternatively include a scheduler 416 that schedules disparate types of synchronization signals within each radio frame as a function of parameter(s) 406 corresponding to base station 402. Thus, scheduler 416 can determine and assign relative locations for PSC and SSC within the radio frame. Moreover, synchronization signal evaluator 410 can detect relative positions of PSC and SSC, and based thereupon, parameter identifier 412 can recognize one or more parameters associated with base station 402. For instance, relative locations of PSC and SSC can be used to differentiate between base station 402 being associated with FS1 versus FS2, TDD versus FDD, unicast versus multicast operation, and/or macro cell versus femto cell. Further, scheduler 416 can control locations of PSC and SSC within a radio frame. Locations of PSC and SSC can be used to represent different types/parts of the system information, which can be associated with TDD or FDD types systems, cells with different sizes or purposes, and so forth.

Figure 5:
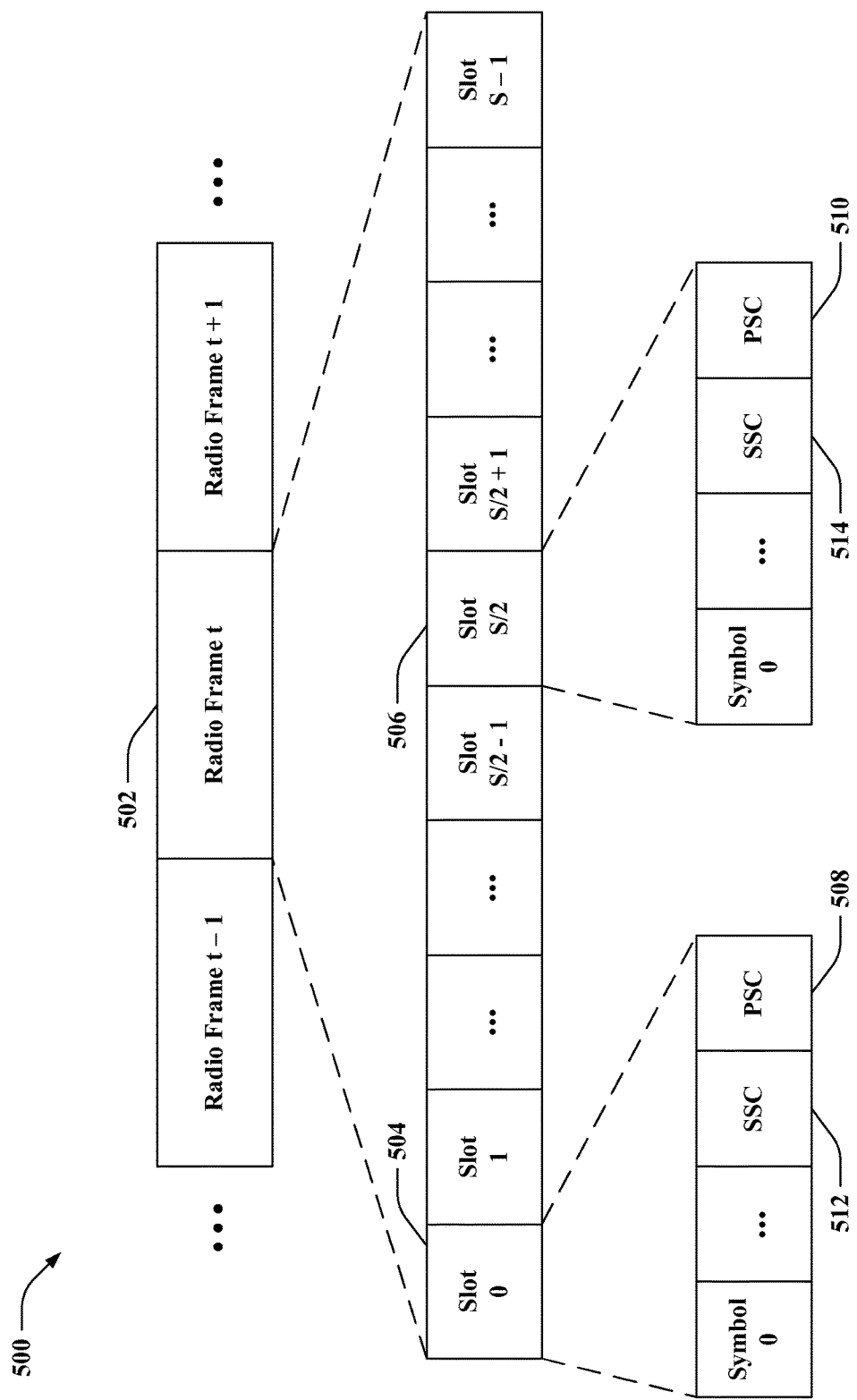
FIGS. 5-6 are illustrations of example radio frame structures that utilize relative positions of synchronization signals to disseminate information related to one or more parameters.
Figure 6:
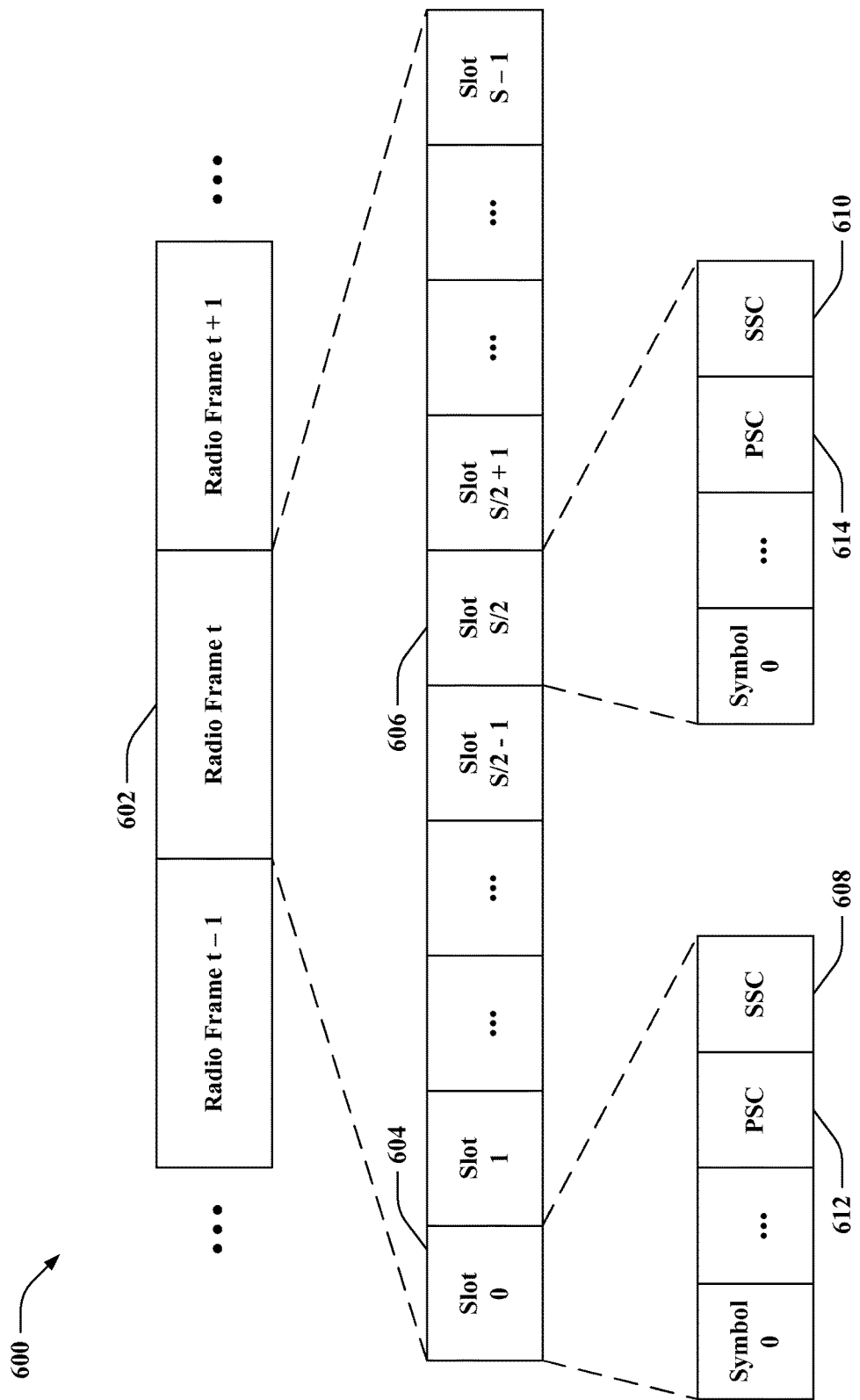

With reference to FIGS. 5-6, illustrated are example radio frame structures 500 and 600 that utilize relative positions of synchronization signals to disseminate information related to one or more parameters. Each radio frame (e.g., radio frame t 502, radio frame t 602, . . . ) can be partitioned into multiple (e.g., S, where S can be substantially any integer, . . . ) slots (e.g., or a subset of the S slots can be replaced by fields as described herein for frame structure type 2, . . . ), and each slot can include multiple (e.g., T, where T can be substantially any integer, . . . ) symbol periods. For example, each radio frame (e.g., radio frame 502, radio frame 602, . . . ) can have a duration of 10 ms, and each slot can have a duration of 0.5 ms. Further, a subframe can include two adjacent slots (e.g., slot 0 and slot 1, . . . ). Moreover, each slot can cover 6 or 7 symbol periods depending on a cyclic prefix length. Although not shown, it is to be appreciated that a frame structure type 1 radio frame can include a subframe comprising slot 2 and slot 3 adjacent to the subframe comprising slot 0 and slot 1 (as well as a subframe comprising slot S/2+2 and slot S/2+3 adjacent to the subframe comprising slot S/2 and slot S/2+1), while a frame structure type 2 radio frame can include a subframe comprising fields (e.g., DwPTS, GP, and UpPTS) adjacent to the subframe comprising slot 0 and slot 1 (as well as another subframe comprising such fields adjacent to the subframe comprising slot S/2 and slot S/2+1). Also, it is contemplated that the radio frames can be partitioned in any disparate manner.

As illustrated, synchronization signals can be mapped to OFDM symbols included in slot 0 504, 604 and slot S/2 506, 606 (e.g., slot 10, . . . ). However, relative placement of PSC and SSC can differ (e.g., as controlled by scheduler 416 of FIG. 4, . . . ) between radio frame structures 500 and 600. As shown in FIG. 5, PSC is mapped to a last OFDM symbol (e.g., symbol 508, symbol 510, . . . ) in slot 0 504 and slot S/2 506 (e.g., the first and eleventh slots, . . . ), while SSC is mapped to an adjacent OFDM symbol (e.g., symbol 512, symbol 514, . . . ) prior to the last OFDM symbol. Moreover, as shown in FIG. 6, SSC is mapped to a last OFDM symbol (e.g., symbol 608, symbol 610, . . . ) in slot 0 604 and slot S/2 606 (e.g., the first and eleventh slots, . . . ), while PSC is mapped to an adjacent OFDM symbol (e.g., symbol 612, symbol 614, . . . ) prior to the last OFDM symbol.

Differences in relative positions of PSC and SSC can be a function of one or more parameters. For example, the relative positions of PSC and SSC in a preamble and a middle amble can depend on whether a base station transmits radio frames with FS1 or FS2. Following this example, in FS1, PSC can be mapped to the last OFDM symbol in the first and eleventh slots and SSC can be next to PSC as shown in FIG. 5. Moreover, in FS2, SSC can be mapped to the last OFDM symbol and PSC can be next to SSC as shown in FIG. 6. Further, a receiving access terminal can detect the PSC and/or SSC to differentiate between such parameter(s). Thus, pursuant to the above example, the receiving access terminal can determine relative positions of PSC and SSC, which can thereafter be leveraged to distinguish whether the transmitting base station utilizes FS1 or FS2. It is to be appreciated, however, that the claimed subject matter is not limited to the aforementioned example; rather, any disparate parameter(s) in addition to or instead of frame structure type can be indicated via the relative positions of PSC and SSC. Examples of these base station specific parameters can be, but are not limited to, whether the base station is associated with multicast versus unicast operation, employs TDD versus FDD, and/or is associated with a femto cell or a macro cell. For instance, PSC and SSC can be placed at different locations (e.g., in a preamble, middle amble, Nth subframe, . . . ) so that an access terminal can differentiate different cell types (e.g., nominal/macro cell versus femto cell, where a femto cell can transmit at a lower power than other macro cells, . . . ) based on such placements.

Although FIGS. 5-6 depict PSC and SSC being mapped to the last two adjacent OFDM symbols in slot 0 504, 604 and slot S/2 506, 606, it is to be appreciated that the claimed subject matter is not so limited. For instance, PSC and/or SSC can be transmitted in any slots in addition to or instead of slot 0 504, 604 and slot S/2 506, 606. Further, PSC and SSC can be mapped to any OFDM symbols within a slot. By way of another example, symbol separation between PSC and SSC (e.g., PSC and SSC being adjacent, separated by one, two, etc. symbols, . . . ) can be a function of one or more parameters. According to a further illustration, PSC need not be transmitted; inclusion or exclusion of PSC can be a function of one or more parameters.

Referring again to FIG. 4, scheduler 416 can also include or exclude PSC from a radio frame yielded for transmission as a function of one or more parameters, for example. Following this example, PSC can be eliminated in FS2 operation mode (e.g., in TDD type systems, . . . ). Further, the location for PSC in FS2 can be used for additional guard time for uplink and downlink switching. Thus, one sequence can be defined for synchronization (e.g., SSC can be reserved but with a different sequence design from FS1, . . . ).

By way of further illustration, synchronization signal generator 408 can employ differing pseudo-random sequences (PRSs) as a function of one or more parameters. For instance, depending on whether FS1 or FS2 is employed by base station 402, different PRSs can be mapped to the same cell identifier (ID). The same PRSs can be reused between FS1 and FS2, but with different mappings to cell IDs. Additionally or alternatively, PRSs can be mapped to different tone locations depending on whether FS1 or FS2 is employed.

In accordance with an example, PRS location in the frequency domain can be linked to cell ID. Different cells can have different locations for the PRS. Thus, to distinguish between different parameters, the same sequence can be used, but with different locations in the frequency domain. An access terminal can detect the PRS to be able to determine the associated parameters. According to an illustration, the PRS location can be used for validation purposes. Following this illustration, a parameter can be indicated based upon relative locations of PSC and SSC, PSC sequence selected to be utilized to generate PSCs, or inclusion/exclusion of PSC, and such parameter can also be notified to an access terminal via the PRS location for validation; however, the claimed subject matter is not so limited.

According to another example, different systems can use different scrambling codes on top of the SSC sequences so that access terminal 404 can use this information to differentiate such systems. For instance, this information can be used to differentiate a TDD system versus a FDD system, a nominal (e.g., macro, . . . ) cell versus a femto cell, a unicast system versus a multicast system (e.g., MBSFN, . . . ), FS1 versus FS2, and so forth. Hence, a particular scrambling code can be selected as a function of a parameter.

Pursuant to another illustration, in E-UTRAN, three PSC based scrambling sequences (SC) can be defined to scramble SSC sequences, where each scrambling sequence can be determined by an index of a corresponding PSC sequence. N additional different scrambling sequences can be used to scramble SSC sequences. As a result, (SC1, SC2, SC3) can be used for a FDD system, while (SC4, SC5, SC6) can be used for a TDD system. Similarly, (SC7, SC8, . . . SCN) can be used for femto cells, and so forth. Thus, a set of scrambling codes out of a plurality of possible sets can be selected as a function of a parameter.

Figure 7:
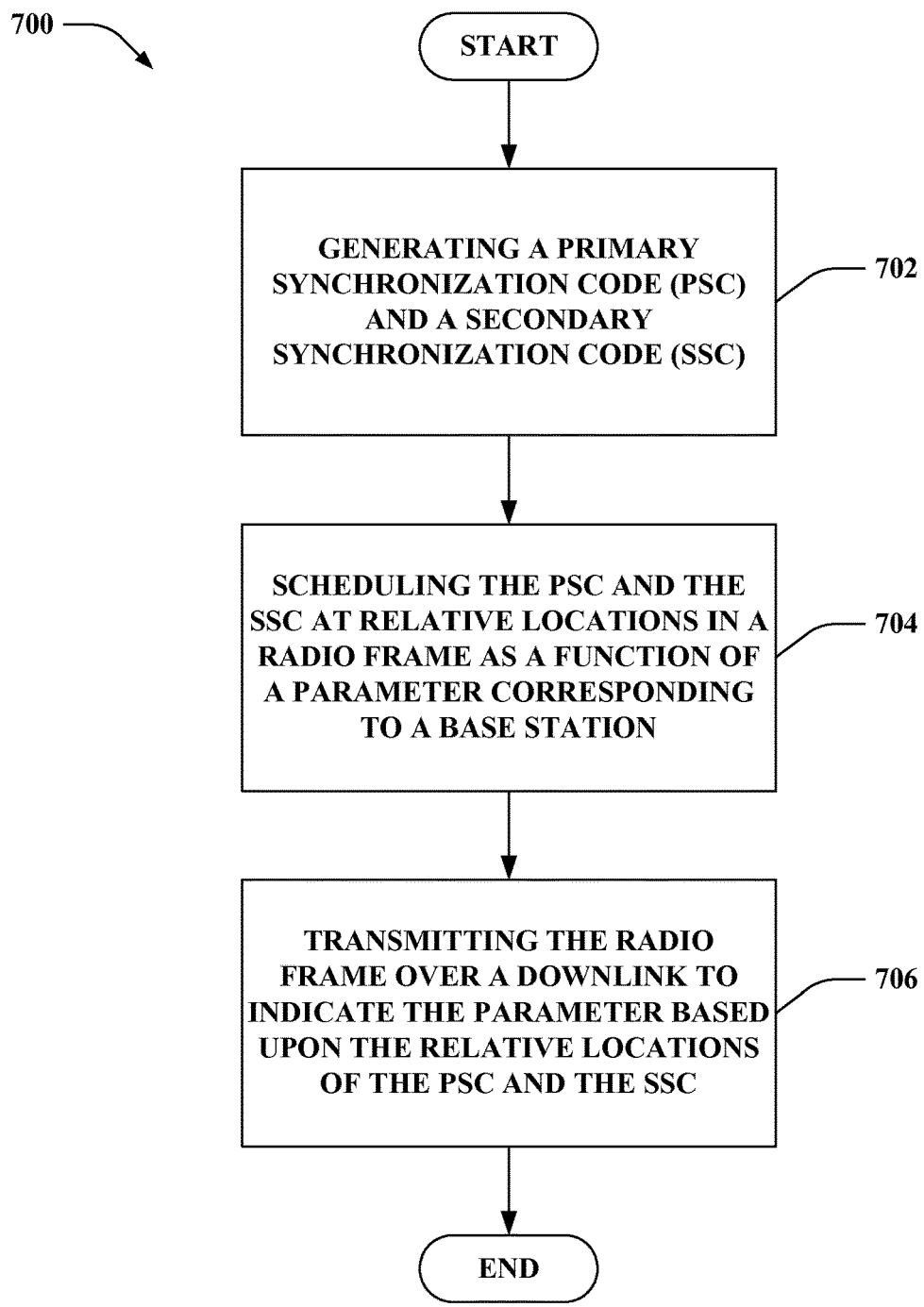
FIG. 7 is an illustration of an example methodology that facilitates identifying one or more parameters related to a base station in a wireless communication environment.
Figure 8:
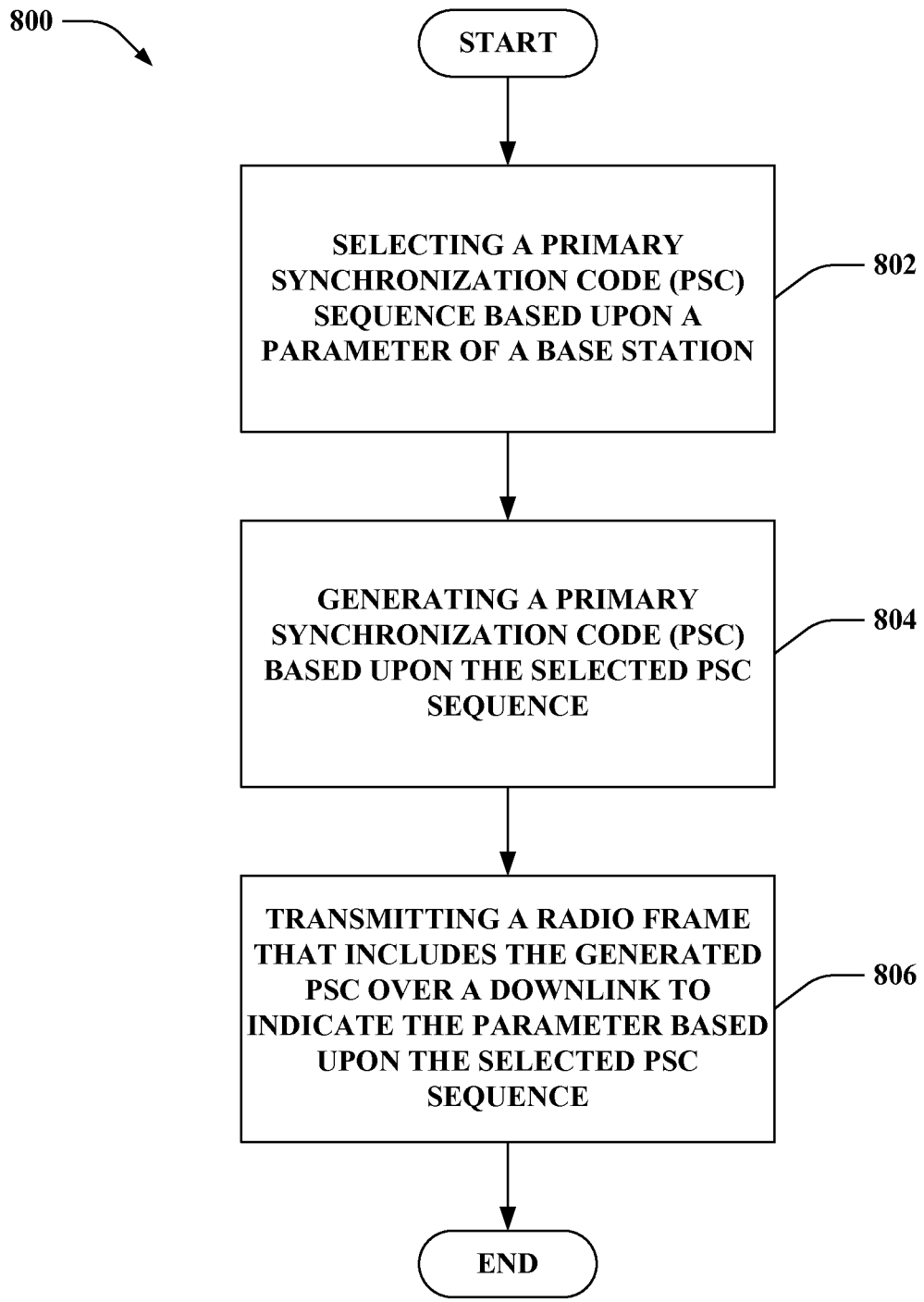
FIG. 8 is an illustration of an example methodology that facilitates indicating one or more parameters corresponding to a base station in a wireless communication environment.
Figure 9:
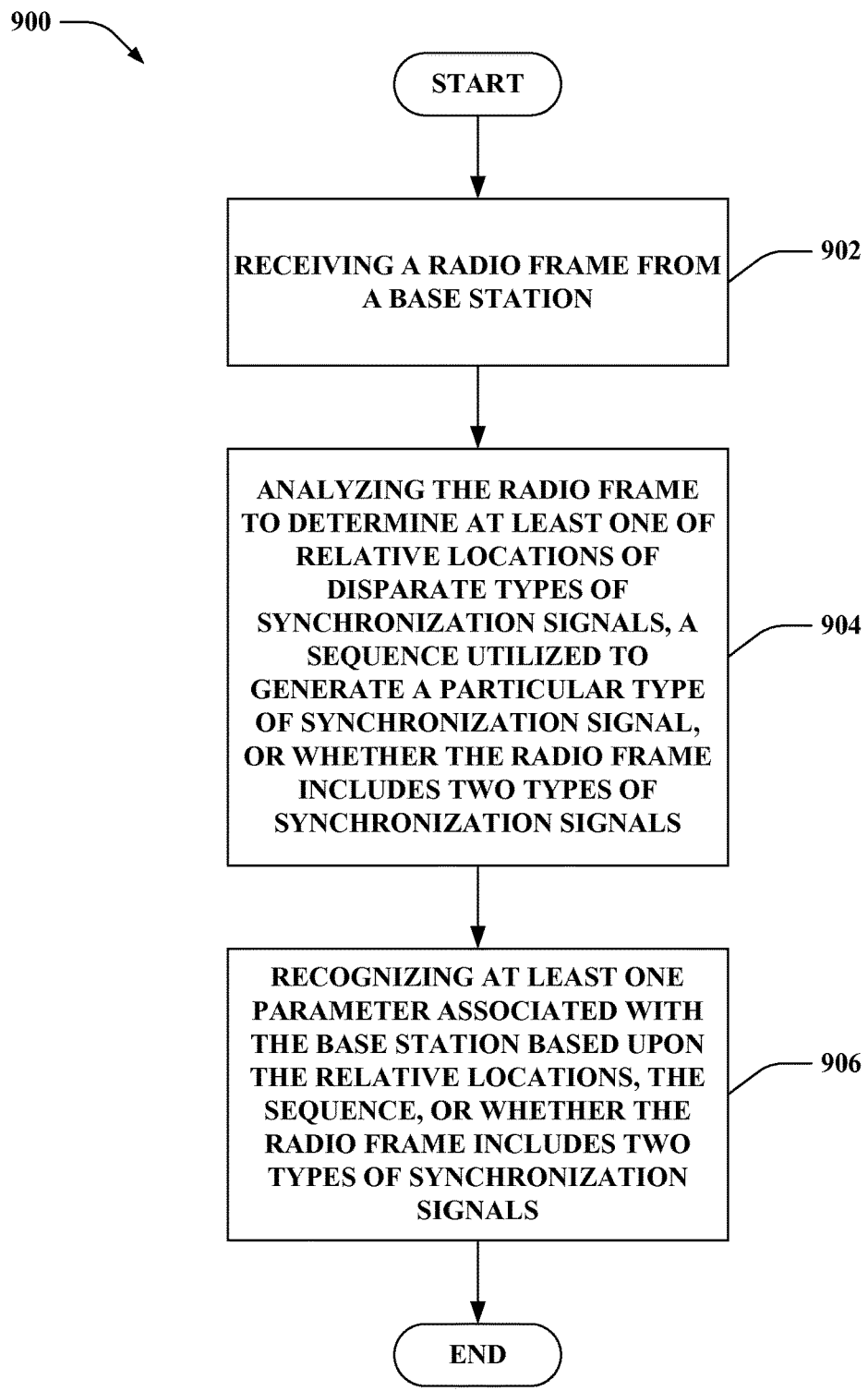
FIG. 9 is an illustration of an example methodology that facilitates deciphering at least one parameter corresponding to a base station in a wireless communication environment.

Referring to FIGS. 7-9, methodologies relating to efficiently indicating parameter(s) in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 7, illustrated is a methodology 700 that facilitates identifying one or more parameters related to a base station in a wireless communication environment. At 702, a primary synchronization code (PSC) and a secondary synchronization code (SSC) can be generated. For instance, the PSC can be generated based upon a PSC sequence and the SSC can be generated based upon a SSC sequence. At 704, the PSC and the SSC can be scheduled at relative locations in a radio frame as a function of a parameter corresponding to a base station. According to an illustration, the parameter can be whether the base station is part of a TDD system or a FDD system. By way of another example, the parameter can be whether the radio frame employs frame structure type 1 (FS1) or frame structure type 2 (FS2). Moreover, the parameter can be whether the base station is associated with a macro cell or a femto cell. Pursuant to a further example, the parameter can be whether the base station is associated with a unicast system or a multicast system. Any relative locations for the PSC and the SSC can be utilized to differentiate between parameters. For instance, whether the PSC or the SSC is mapped to an earlier OFDM symbol in one or more slots of the radio frame can be a function of the parameter. According to another example, symbol separation between the PSC and the SSC can be a function of the parameter. At 706, the radio frame can be transmitted over a downlink to indicate the parameter based upon the relative locations of the PSC and the SSC.

By way of example, the PSC can be mapped to a last OFDM symbol in one or more slots of the radio frame, while the SSC can be mapped to an adjacent OFDM symbol immediately prior to the last OFDM symbol when FS1 is employed. Following this example, the SSC can be mapped to the last OFDM symbol in one or more slots of the radio frame, while the PSC can be mapped to the adjacent OFDM symbol immediately prior to the last OFDM symbol when FS2 is utilized. Based upon the transmitted radio frame, an access terminal can detect the relative locations of the PSC and the SSC to determine whether FS1 or FS2 is employed. It is to be appreciated, however, that the claimed subject matter is not limited to the aforementioned example.

According to another illustration (as described below), the PSC sequence utilized to generate the PSC for inclusion in the radio frame can be selected as a function of a parameter, which can be the same or differ from the parameter indicated via the relative locations. By way of further example, different pseudo random sequences (PRSs) can be mapped to a common cell ID as a function of a parameter (e.g., same or different parameter as indicated via the relative locations, . . . ). Additionally or alternatively, PRSs can be mapped to different tone locations based upon a parameter (e.g., same or different parameter as indicated via the relative locations, . . . ). For instance, PRS mappings can be leveraged as a validation mechanism for the parameter indicated by way of the relative locations of the PSC and the SSC; however, the claimed subject matter is not so limited. According to another illustration, the PSC can be eliminated from the radio frame when utilizing FS2; however, the claimed subject matter is not so limited. By way of further example, a particular scrambling code from a set of possible scrambling codes can be selected to be employed on top of a SSC sequence to yield the SSC as a function of a parameter. Additionally or alternatively, a set of possible scrambling codes, from which a particular scrambling code can be chosen to be utilized on top of a SSC sequence to generate the SSC, can be selected as a function of a parameter.

Now turning to FIG. 8, illustrated is a methodology 800 that facilitates indicating one or more parameters corresponding to a base station in a wireless communication environment. At 802, a primary synchronization code (PSC) sequence can be selected based upon a parameter of a base station. For instance, four possible PSC sequences can be employed, which can include three commonly utilized PSC sequences and one additional PSC sequence. Two of the commonly utilized PSC sequences can be complex conjugates of each other, while the third of the commonly utilized PSC sequences and the fourth, additional PSC sequence can be complex conjugates of each other. Further, either one of the three commonly utilized PSC sequences or the fourth, additional PSC sequence can be selected for use based upon the parameter. At 804, a primary synchronization code (PSC) can be generated based upon the selected PSC sequence. At 806, a radio frame that includes the generated PSC can be transmitted over a downlink to indicate the parameter based upon the selected PSC sequence. For instance, an access terminal that receives the radio frame can detect the selected PSC sequence and determine the parameter based thereupon.

In accordance with an example, selection of the PSC sequence can be utilized to differentiate between FS1 and FS2. Following this example, one of the three commonly utilized PSC sequences can be chosen when FS1 is employed, while the fourth, additional PSC sequence can be selected when FS2 is utilized (or vice versa). By way of another illustration, selection of the PSC sequence can be used to differentiate between the base station being associated with a unicast system and a multicast system. Thus, one of the three commonly utilized PSC sequences can be selected when a unicast carrier is used, while the fourth, additional PSC sequence can be chosen when a MBSFN carrier is utilized (or vice versa). Moreover, relative locations of the PSC and the SSC, PRS mappings, choice of scrambling code, election of scrambling code set, etc. can be leveraged in conjunction with selection of the PSC sequence to provide notification related to the same parameter (e.g., indicated via PSC sequence selection, . . . ) or different parameter(s).

Referring to FIG. 9, illustrated is a methodology 900 that facilitates deciphering at least one parameter corresponding to a base station in a wireless communication environment. At 902, a radio frame can be received from a base station. At 904, the radio frame can be analyzed to determine at least one of relative locations of disparate types of synchronization signals, a sequence utilized to generate a particular type of synchronization signal, or whether the radio frame includes two types of synchronization signals. For instance, relative locations of a PSC with respect to a SSC can be identified. According to another example, a PSC sequence utilized to generate PSCs can be determined. Additionally or alternatively, a PSC can be identified as being included or excluded from the received radio frame. By way of further illustration, a scrambling code utilized by the base station to scramble the SSC can be identified. At 906, at least one parameter associated with the base station can be recognized based upon the relative locations, the sequence, or whether the radio frame includes two types of synchronization signals. Further, the at least one parameter can be validated based upon an evaluation of a utilized PRS sequence.

It will be appreciated that, in accordance with one or more aspects described herein, inferences can be made regarding efficiently notifying and/or identifying parameter(s) associated with a base station in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining an identity of one or more parameters associated with a base station based upon an evaluation of received synchronization signal(s). By way of further illustration, an inference can be made related to determining a notification scheme employed by a base station for communicating one or more parameter(s) associated therewith via the downlink. It will be appreciated that the foregoing examples are illustrative in nature and are not intended to limit the number of inferences that can be made or the manner in which such inferences are made in conjunction with the various embodiments and/or methods described herein.

Figure 10:
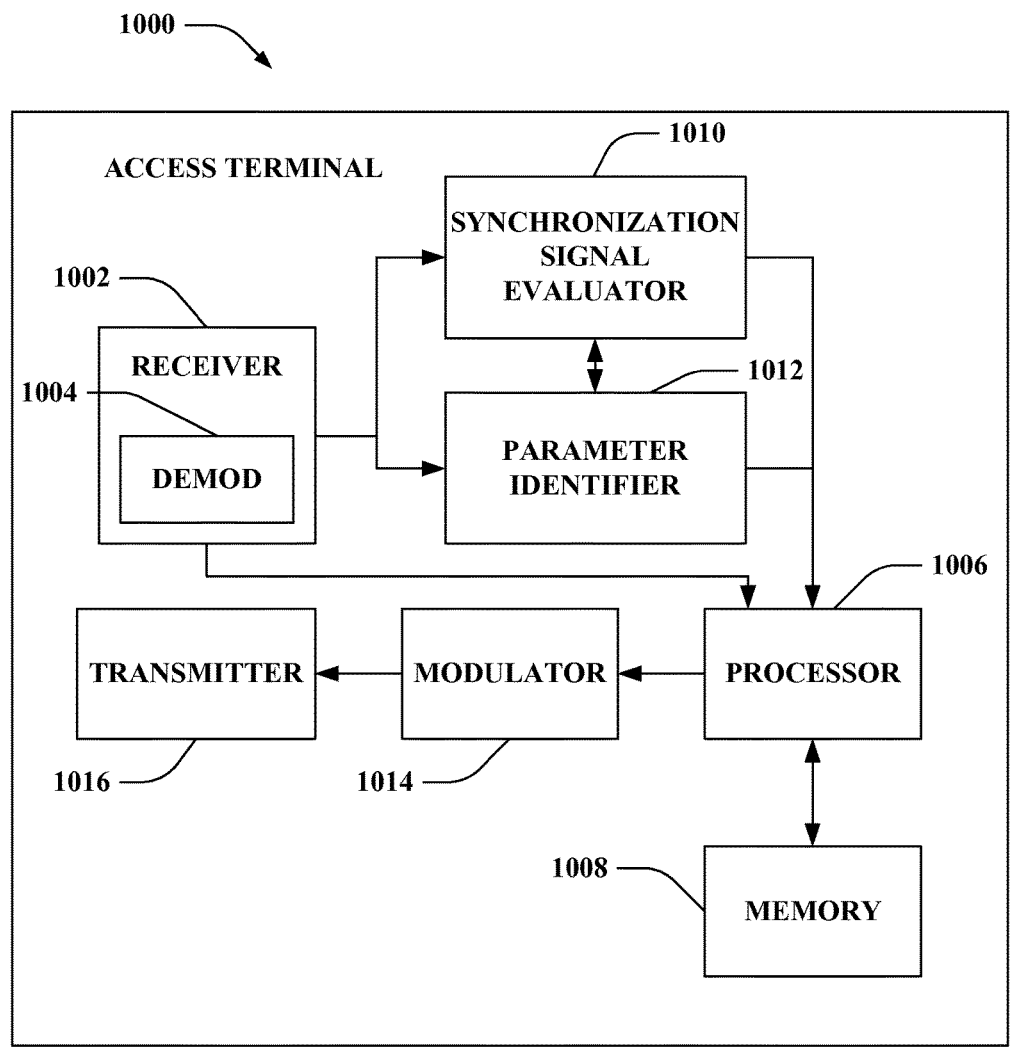
FIG. 10 is an illustration of an example access terminal that recognizes parameter(s) associated with a base station utilizing an efficient identification scheme in a wireless communication system.

FIG. 10 is an illustration of an access terminal 1000 that recognizes parameter(s) associated with a base station utilizing an efficient identification scheme in a wireless communication system. Access terminal 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of access terminal 1000, and/or a processor that both analyzes information received by receiver 1002, generates information for transmission by transmitter 1016, and controls one or more components of access terminal 1000.

Access terminal 1000 can additionally comprise memory 1008 that is operatively coupled to processor 1006 and that can store data to be transmitted, received data, and any other suitable information related to performing the various actions and functions set forth herein. Memory 1008, for instance, can store protocols and/or algorithms associated with analyzing synchronization signal(s) included in received radio frames and/or determining parameter(s) based upon such analysis.

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Receiver 1002 is further operatively coupled to a synchronization signal evaluator 1010 and/or a parameter identifier 1012. Synchronization signal evaluator 1010 can be substantially similar to synchronization signal evaluator 410 of FIG. 4. Moreover, parameter identifier 1012 can be substantially similar to parameter identifier 412 of FIG. 4. Synchronization signal evaluator 1010 can evaluate synchronization signal(s) included in received radio frames. For example, synchronization signal evaluator 1010 can determine relative locations of differing types of synchronization signals (e.g., relative locations of a PSC versus a SSC, . . . ). According to another illustration, synchronization signal evaluator 1010 can recognize a sequence (e.g., PSC sequence, . . . ) utilized to generate a particular type of synchronization signal (e.g., PSC, . . . ). Pursuant to another illustration, synchronization signal evaluator 1010 can analyze whether the radio frames include one or two types of synchronization signals (e.g., whether the radio frames include or lack PSCs, . . . ). Moreover, synchronization signal evaluator 1010 can review a PRS associated with the radio frames. Further, parameter identifier 1012 can leverage the analysis effectuated by synchronization signal evaluator 1010 to determine one or more parameters corresponding to a base station that sent the radio frames over the downlink. Access terminal 1000 still further comprises a modulator 1014 and a transmitter 1016 that transmits the signal to, for instance, a base station, another access terminal, etc. Although depicted as being separate from the processor 1006, it is to be appreciated that synchronization signal evaluator 1010, parameter identifier 1012 and/or modulator 1014 can be part of processor 1006 or a number of processors (not shown).

Figure 11:
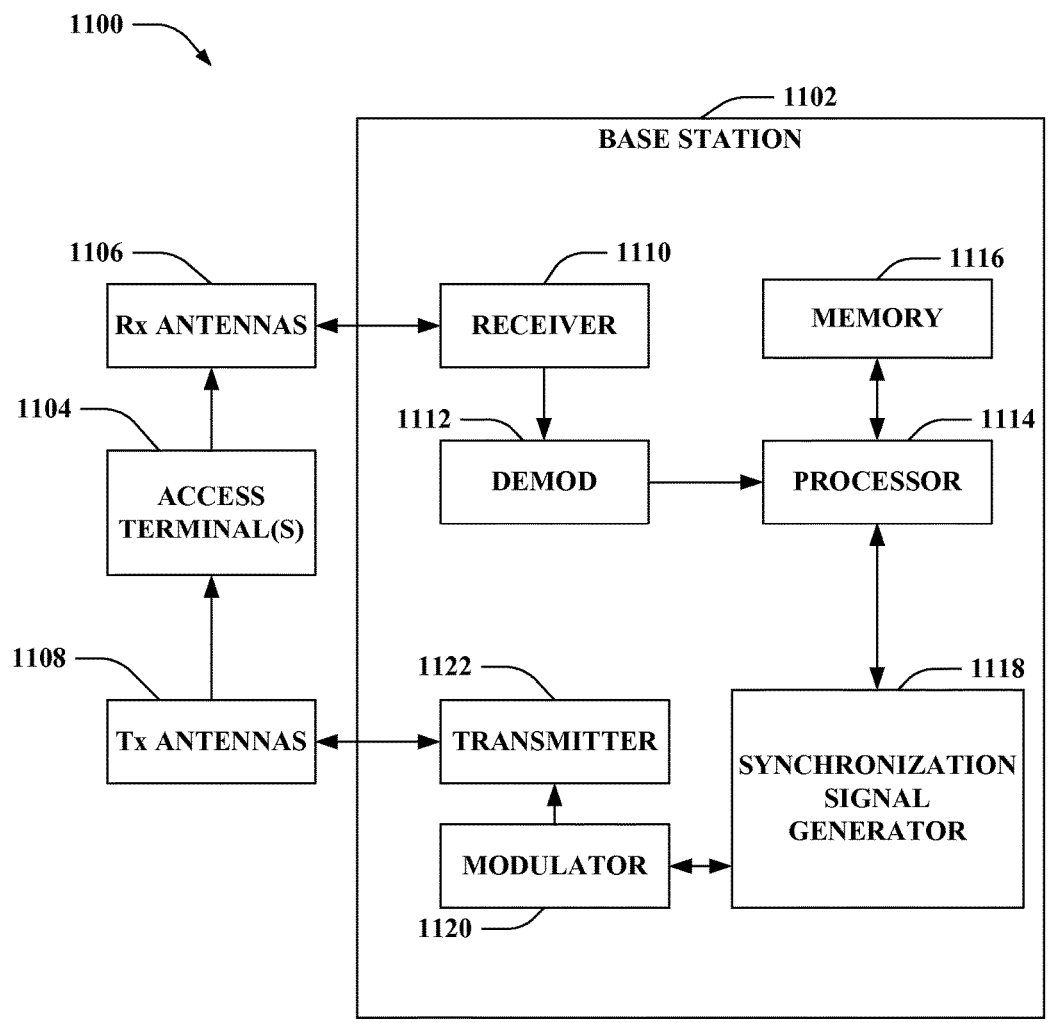
FIG. 11 is an illustration of an example system that utilizes synchronization signals to indicate parameter(s) to access terminals in a wireless communication environment.

FIG. 11 is an illustration of a system 1100 that utilizes synchronization signals to indicate parameter(s) to access terminals in a wireless communication environment. System 1100 comprises a base station 1102 (e.g., access point, . . . ) with a receiver 1110 that receives signal(s) from one or more access terminals 1104 through a plurality of receive antennas 1106, and a transmitter 1122 that transmits to the one or more access terminals 1104 through a transmit antenna 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores data to be transmitted to or received from access terminal(s) 1104 (or a disparate base station (not shown)) and/or any other suitable information related to performing the various actions and functions set forth herein. Processor 1114 is further coupled to a synchronization signal generator 1118 that yields synchronization signals for transmission to access terminal(s) 1104 as a function of parameter(s) associated therewith. For instance, synchronization signal generator 1118 can select PSC sequences based upon a parameter, position a PSC and a SSC in relative locations as a function of a parameter, included or exclude a PSC from a radio frame based upon a parameter, select a PRS based upon a parameter, and so forth. It is contemplated that synchronization signal generator 1118 can be substantially similar to synchronization signal generator 408 of FIG. 4. Although not shown, it is to be appreciated that synchronization signal generator 1118 can include a selector (e.g., substantially similar to selector 414 of FIG. 4) and/or a scheduler (e.g., substantially similar to scheduler 416 of FIG. 4). Further, synchronization signal generator 1118 can provide information to be transmitted (e.g., radio frame, . . . ) to a modulator 1120. Modulator 1120 can multiplex a frame for transmission by a transmitter 1122 through antennas 1108 to access terminal(s) 1104. Although depicted as being separate from the processor 1114, it is to be appreciated that synchronization signal generator 1118 and/or modulator 1120 can be part of processor 1114 or a number of processors (not shown).

Figure 12:
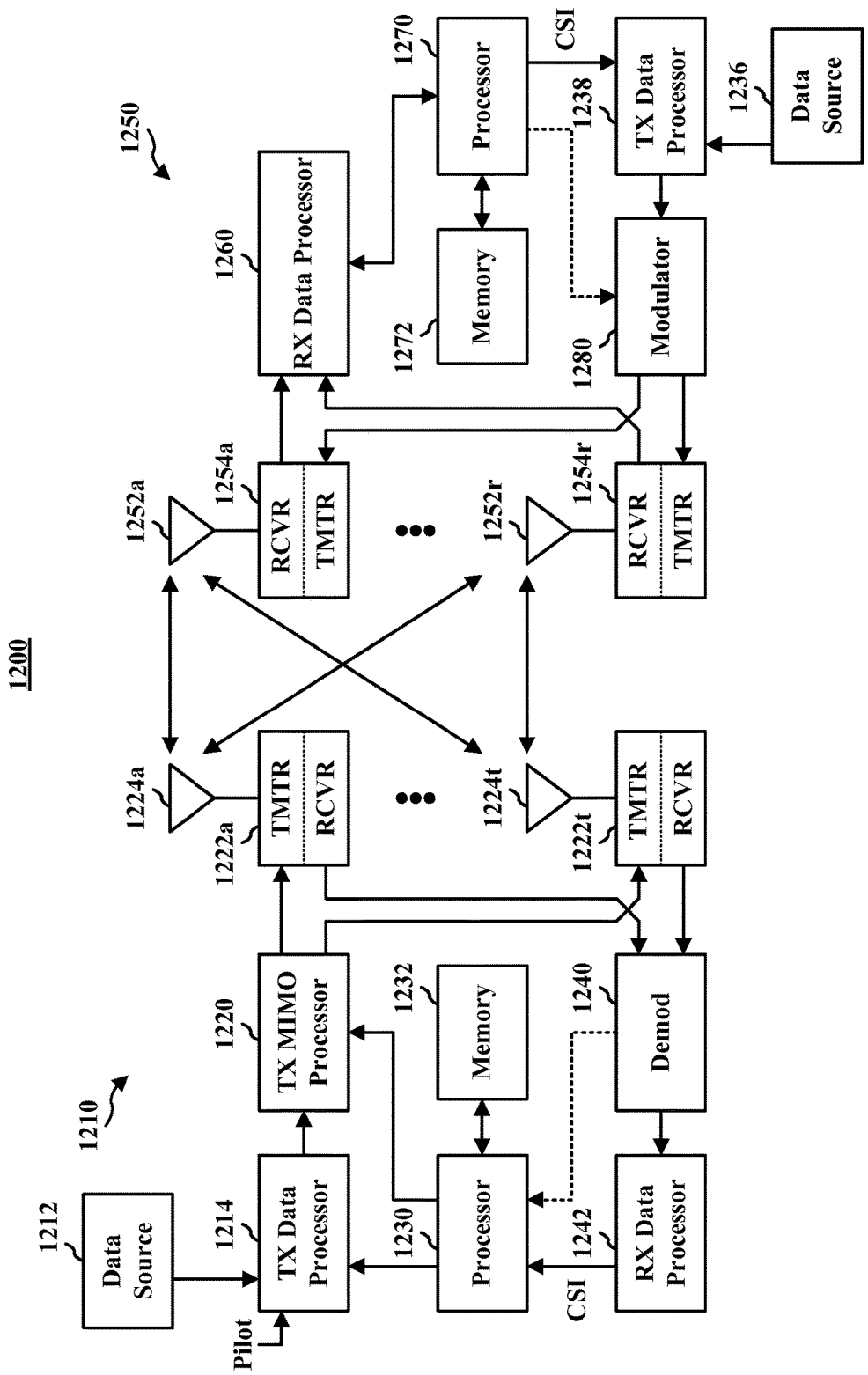
FIG. 12 is an illustration of an example wireless network environment that can be employed in conjunction with the various systems and methods described herein.

FIG. 12 shows an example wireless communication system 1200. The wireless communication system 1200 depicts one base station 1210 and one access terminal 1250 for sake of brevity. However, it is to be appreciated that system 1200 can include more than one base station and/or more than one access terminal, wherein additional base stations and/or access terminals can be substantially similar or different from example base station 1210 and access terminal 1250 described below. In addition, it is to be appreciated that base station 1210 and/or access terminal 1250 can employ the systems (FIGS. 1, 4, 10-11, and 13-14) and/or methods (FIGS. 7-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At access terminal 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which available technology to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from access terminal 1250 are received by antennas 1224, conditioned by receivers 1222, demodulated by a demodulator 1240, and processed by a RX data processor 1242 to extract the reverse link message transmitted by access terminal 1250. Further, processor 1230 can process the extracted message to determine which precoding matrix to use for determining the beamforming weights.

Processors 1230 and 1270 can direct (e.g., control, coordinate, manage, etc.) operation at base station 1210 and access terminal 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
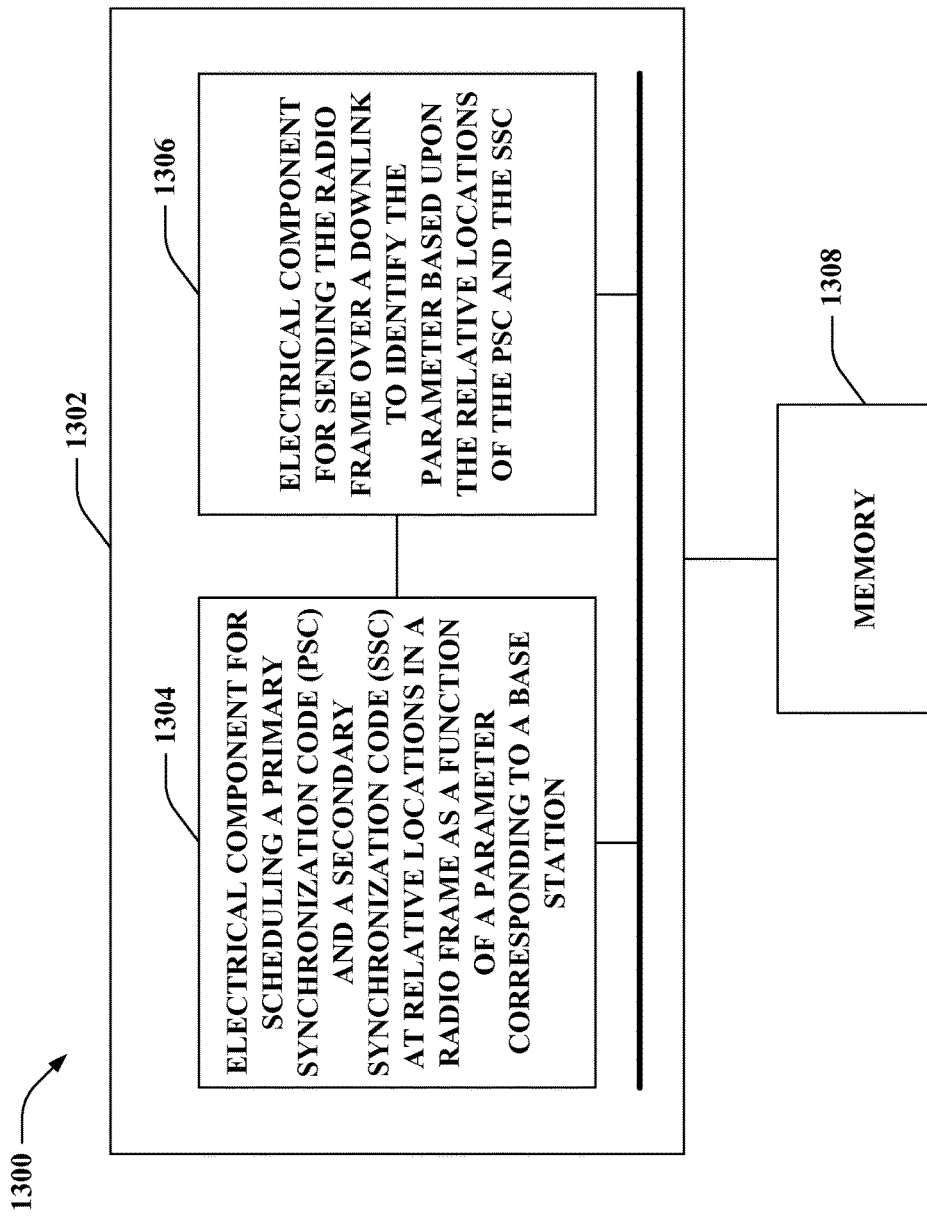
FIG. 13 is an illustration of an example system that enables efficiently indicating one or more parameters to at least one access terminal in a wireless communication environment.

With reference to FIG. 13, illustrated is a system 1300 that enables efficiently indicating one or more parameters to at least one access terminal in a wireless communication environment. For example, system 1300 can reside at least partially within a base station. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for scheduling a primary synchronization code (PSC) and a secondary synchronization code (SSC) at relative locations in a radio frame as a function of a parameter corresponding to a base station 1304. Moreover, logical grouping can comprise an electrical component for sending the radio frame over a downlink to identify the parameter based upon the relative locations of the PSC and the SSC 1306. Further, although not shown, logical grouping can also include an electrical component for selecting a PSC sequence based upon a parameter of the base station and an electrical component for generating the PSC based upon the selected PSC sequence. Additionally, system 1300 can include a memory 1308 that retains instructions for executing functions associated with electrical components 1304 and 1306. While shown as being external to memory 1308, it is to be understood that one or more of electrical components 1304 and 1306 can exist within memory 1308.

Figure 14:
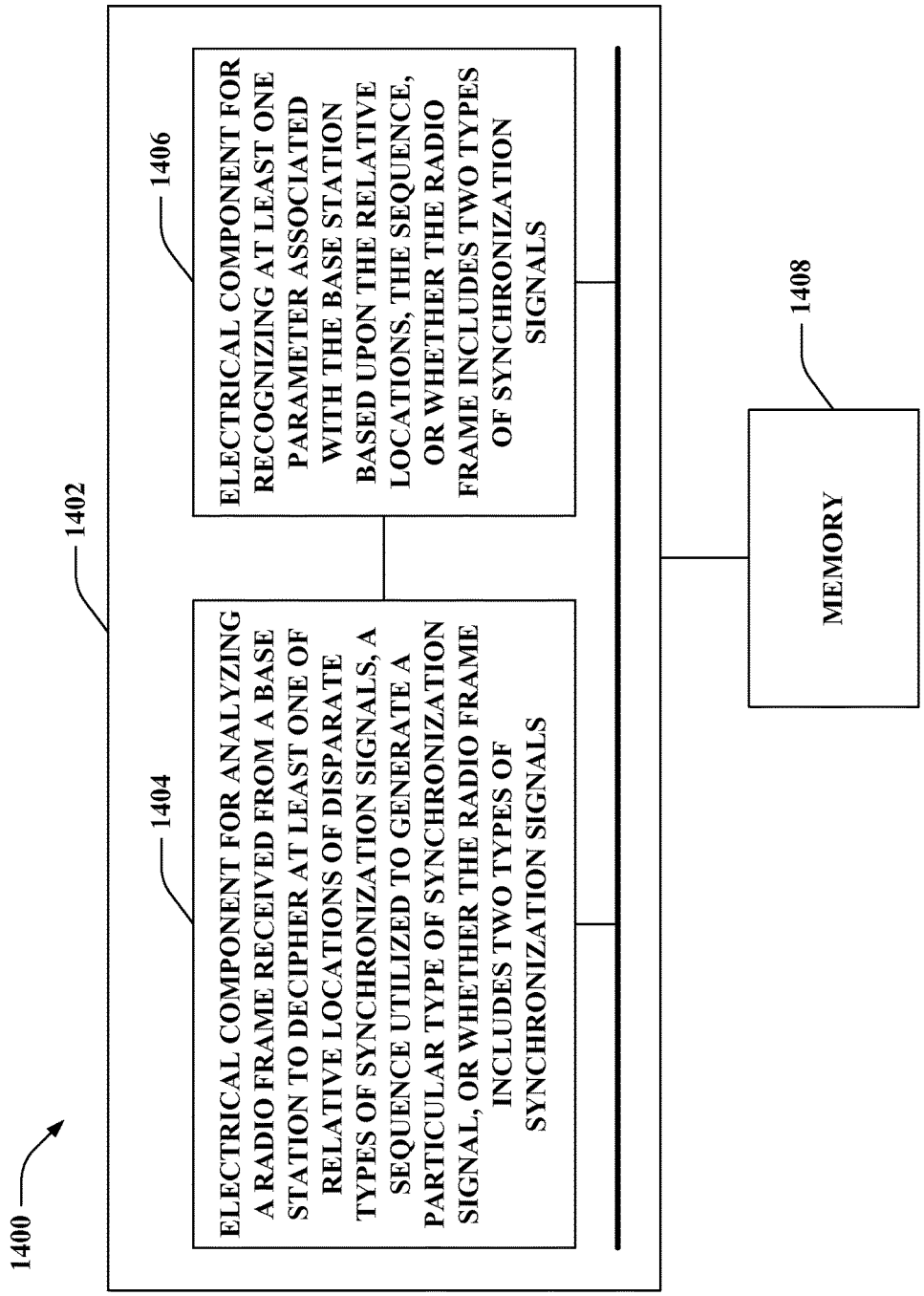
FIG. 14 is an illustration of an example system that enables identifying one or more parameters relative to a base station in a wireless communication environment.

Turning to FIG. 14, illustrated is a system 1400 that enables identifying one or more parameters relative to a base station in a wireless communication environment. System 1400 can reside within an access terminal, for instance. As depicted, system 1400 includes functional blocks that can represent functions implemented by a processor, software, or combination thereof (e.g., firmware). System 1400 includes a logical grouping 1402 of electrical components that can act in conjunction. Logical grouping 1402 can include an electrical component for analyzing a radio frame received from a base station to decipher at least one of relative locations of disparate types of synchronization signals, a sequence utilized to generate a particular type of synchronization signal, or whether the radio frame includes two types of synchronization signals 1404. For instance, the disparate types of synchronization signals can be PSCs and SSCs. Moreover, the sequence can be a PSC sequence. Further, the radio frame can be analyzed to determine whether it includes at least one PSC and at least one SSC or at least one SSC without a PSC. Further, logical grouping 1402 can include an electrical component for recognizing at least one parameter associated with the base station based upon the relative locations, the sequence, or whether the radio frame includes two types of synchronization signals 1406. Additionally, system 1400 can include a memory 1408 that retains instructions for executing functions associated with electrical components 1404 and 1406. While shown as being external to memory 1408, it is to be understood that electrical components 1404 and 1406 can exist within memory 1408.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for deciphering at least one parameter corresponding to a base station in a wireless communication environment, comprising:
   receiving a radio frame from a base station;
   analyzing the radio frame to determine relative locations of disparate types of synchronization signals, a sequence utilized to generate a particular type of synchronization signal, and whether the radio frame includes two types of synchronization signals; and
   recognizing at least one parameter associated with the base station based upon the relative locations, the sequence, and whether the radio frame includes two types of synchronization signals.

2. The method of claim 1, further comprising:
   identifying the relative locations of a primary synchronization code (PSC) and a secondary synchronization code (SSC); and
   recognizing one or more of the at least one parameter based at least in part upon the identified relative locations.

3. The method of claim 1, further comprising:
   determining a primary synchronization code (PSC) sequence utilized to generate a PSC included in the received radio frame; and
   deciphering one or more of the at least one parameter based at least in part upon the determined PSC sequence.

4. The method of claim 1, further comprising:
   identifying whether a PSC is included or excluded from the radio frame; and
   determining one or more of the at least one parameter based at least in part upon whether the PSC is included or excluded from the radio frame.

5. The method of claim 1, further comprising:
   analyzing a pseudo random sequence mapping associated with the radio frame; and
   determining one or more of the at least one parameter based at least in part upon the pseudo random sequence mapping.

6. The method of claim 1, further comprising:
   identifying a scrambling code utilized by the base station to scramble a SSC; and
   determining one or more of the at least one parameter based at least in part upon the identity of the scrambling code.

7. The method of claim 1, wherein the at least one parameter is one or more of whether the base station is part of a time division duplex (TDD) system or a frequency division duplex (FDD) system, whether the radio frame employs frame structure type 1 (FS1) or frame structure type 2 (FS2), whether the base station is associated with a macro cell or a femto cell, or whether the base station is associated with a unicast system or a multicast system.

8. A wireless communications apparatus, comprising:
   a memory that retains instructions related to receiving a radio frame from a base station, analyzing the radio frame to determine relative locations of disparate types of synchronization signals, a sequence utilized to generate a particular type of synchronization signal, and whether the radio frame includes two types of synchronization signals, and recognizing at least one parameter associated with the base station based upon the relative locations, the sequence, and whether the radio frame includes two types of synchronization signals; and
   a processor, coupled to the memory, configured to execute the instructions retained in the memory.

9. The wireless communications apparatus of claim 8, wherein the memory further retains instructions related to identifying the relative locations of a primary synchronization code (PSC) and a secondary synchronization code (SSC), and recognizing one or more of the at least one parameter based at least in part upon the identified relative locations.

10. The wireless communications apparatus of claim 8, wherein the memory further retains instructions related to determining a primary synchronization code (PSC) sequence utilized to generate a PSC included in the received radio frame, and deciphering one or more of the at least one parameter based at least in part upon the determined PSC sequence.

11. The wireless communications apparatus of claim 8, wherein the memory further retains instructions related to identifying whether a PSC is included or excluded from the radio frame, and determining one or more of the at least one parameter based at least in part upon whether the PSC is included or excluded from the radio frame.

12. The wireless communications apparatus of claim 8, wherein the memory further retains instructions related to analyzing a pseudo random sequence mapping associated with the radio frame, and determining one or more of the at least one parameter based at least in part upon the pseudo random sequence mapping.

13. The wireless communications apparatus of claim 8, wherein the memory further retains instructions related to identifying a scrambling code utilized by the base station to scramble a SSC, and determining one or more of the at least one parameter based at least in part upon the identity of the scrambling code.

14. The wireless communications apparatus of claim 8, wherein the at least one parameter is one or more of whether the base station is part of a time division duplex (TDD) system or a frequency division duplex (FDD) system, whether the radio frame employs frame structure type 1 (FS1) or frame structure type 2 (FS2), whether the base station is associated with a macro cell or a femto cell, or whether the base station is associated with a unicast system or a multicast system.

15. A wireless communications apparatus that enable identifying one or more parameters relative to a base station in a wireless communication environment, comprising:
   means for analyzing a radio frame received from a base station to decipher relative locations of disparate types of synchronization signals, a sequence utilized to generate a particular type of synchronization signal, and whether the radio frame includes two types of synchronization signals; and
   means for recognizing at least one parameter associated with the base station based upon the relative locations, the sequence, and whether the radio frame includes two types of synchronization signals.

16. The wireless communications apparatus of claim 15, further comprising:
   means for identifying the relative locations of a primary synchronization code (PSC) and a secondary synchronization code (SSC); and means for recognizing one or more of the at least one parameter based at least in part upon the identified relative locations.

17. The wireless communications apparatus of claim 15, further comprising:
means for determining a primary synchronization code (PSC) sequence utilized to generate a PSC included in the received radio frame; and
means for deciphering one or more of the at least one parameter based at least in part upon the determined PSC sequence.

18. The wireless communications apparatus of claim 15, further comprising:
means for identifying whether a PSC is included or excluded from the radio frame; and
means for determining one or more of the at least one parameter based at least in part upon whether the PSC is included or excluded from the radio frame.

19. The wireless communications apparatus of claim 15, further comprising:
means for analyzing a pseudo random sequence mapping associated with the radio frame; and
means for determining one or more of the at least one parameter based at least in part upon the pseudo random sequence mapping.

20. The wireless communications apparatus of claim 15, further comprising:
means for identifying a scrambling code utilized by the base station to scramble a SSC; and
means for deciphering one or more of the at least one parameter based at least in part upon the identity of the scrambling code.

21. The wireless communications apparatus of claim 15, wherein the at least one parameter is one or more of whether the base station is part of a time division duplex (TDD) system or a frequency division duplex (FDD) system, whether the radio frame employs frame structure type 1 (FS1) or frame structure type 2 (FS2), whether the base station is associated with a macro cell or a femto cell, or whether the base station is associated with a unicast system or a multicast system.

22. A non-transitory computer-readable medium storing computer executable code, comprising code to:
analyze a radio frame received from a base station to decipher relative locations of disparate types of synchronization signals, a sequence utilized to generate a particular type of synchronization signal, and whether the radio frame includes two types of synchronization signals; and
recognize at least one parameter associated with the base station based upon the relative locations, the sequence, and whether the radio frame includes two types of synchronization signals.

23. The non-transitory computer-readable medium of claim 22, further comprising code to:
identify the relative locations of a primary synchronization code (PSC) and a secondary synchronization code (SSC), and
recognize one or more of the at least one parameter based at least in part upon the identified relative locations.

24. The non-transitory computer-readable medium of claim 22, further comprising code to:
determine a primary synchronization code (PSC) sequence utilized to generate a PSC included in the received radio frame, and
decipher one or more of the at least one parameter based at least in part upon the determined PSC sequence.

25. The non-transitory computer-readable medium of claim 22, further comprising code to:
identify whether a PSC is included or excluded from the radio frame, and
determine one or more of the at least one parameter based at least in part upon whether the PSC is included or excluded from the radio frame.

26. The non-transitory computer-readable medium of claim 22, further comprising code to:
analyze a pseudo random sequence mapping associated with the radio frame, and
determine one or more of the at least one parameter based at least in part upon the pseudo random sequence mapping.

27. The non-transitory computer-readable medium of claim 22, further comprising code to:
recognize an identity of a scrambling code used by a base station to scramble a SSC, and code for determining one or more of the at least one parameter based at least in part upon the identity of the scrambling code.

28. The non-transitory computer-readable medium of claim 22, wherein the at least one parameter is one or more of whether the base station is part of a time division duplex (TDD) system or a frequency division duplex (FDD) system, whether the radio frame employs frame structure type 1 (FS1) or frame structure type 2 (FS2), whether the base station is associated with a macro cell or a femto cell, or whether the base station is associated with a unicast system or a multicast system.

* * * * *